(12) United States Patent
Ma et al.

(10) Patent No.: US 11,006,041 B1
(45) Date of Patent: May 11, 2021

(54) MULTIPLE CAMERA SYSTEM FOR WIDE ANGLE IMAGING

(71) Applicant: QUALCOMM Incorporated, San Diego, CA (US)

(72) Inventors: Jian Ma, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/868,822

(22) Filed: May 7, 2020

(51) Int. Cl.
  *H04N 5/265* (2006.01)
  *H04N 5/232* (2006.01)
  *H04N 5/262* (2006.01)
  *H04N 5/225* (2006.01)

(52) U.S. Cl.
  CPC ....... *H04N 5/23238* (2013.01); *H04N 5/2258* (2013.01); *H04N 5/265* (2013.01); *H04N 5/2628* (2013.01)

(58) Field of Classification Search
  None
  See application file for complete search history.

(56) References Cited

U.S. PATENT DOCUMENTS

| | | | |
|---|---|---|---|
| 9,398,264 B2 | 7/2016 | Georgiev et al. | |
| 2014/0212054 A1* | 7/2014 | Lee | G06K 9/3275 382/224 |
| 2016/0360121 A1* | 12/2016 | Cheng | H04N 13/239 |
| 2018/0096487 A1* | 4/2018 | Nash | H04N 5/23232 |

* cited by examiner

*Primary Examiner* — Eileen M Adams
(74) *Attorney, Agent, or Firm* — QUALCOMM Incorporated

(57) ABSTRACT

Aspects relate to digital imaging. An example method includes receiving a first image frame of a scene captured by a first image sensor. The method also includes receiving a second image frame of the scene captured by a second image sensor. The second image frame is captured concurrently with capture of the first image frame. The method also includes receiving a third image frame of the scene captured by a third image sensor. The third image frame is captured concurrently with capture of the first image frame. The method also includes generating a combined image from the first image frame, the second image frame, and the third image frame. The combined image includes a first field of view that is wider than a field of view of the first image frame.

28 Claims, 15 Drawing Sheets

1300

Receive a first image frame of a scene captured by a first image sensor. 1302

Receive a second image frame of the scene captured by a second image sensor, wherein the second image frame is captured concurrently with capture of the first image frame. 1304

Receive a third image frame of the scene captured by a third image sensor, wherein the second image frame is captured concurrently with capture of the first image frame. 1306

Generate a combined image from the first image frame, the second image frame, and the third image frame, wherein the combined image includes a field of view wider than the first image frame's field of view. 1308

Capture a first image frame by a first image sensor with a first field of view. 1402

Concurrently capture a second image frame by a second image sensor with a second field of view. 1404

Direct, by a first mirror, light to the second image sensor to capture the second image frame. 1406

Refract, by a first prism including the first mirror, light to the second image sensor to capture the second image frame. 1408

Concurrently capture a third image frame by a third image sensor with a third field of view. 1410

Direct, by a second mirror, light to the third image sensor to capture the third image frame. 1412

Refract, by a second prism including the second mirror, light to the third image sensor to capture the third image frame. 1414

FIG. 14

MULTIPLE CAMERA SYSTEM FOR WIDE ANGLE IMAGING

TECHNICAL FIELD

This disclosure relates generally to image or video capture devices, including a multiple image sensor system for generating wide angle images.

BACKGROUND

Many devices include one or more cameras. For example, a smartphone or tablet includes a front facing camera to capture selfie images and a rear facing camera to capture a scene (such as a landscape or other scenes of interest to a device user). A user may wish to capture a scene that does not fit within a field of view of a camera. For example, a user may wish to capture a panorama image of a landscape. Some devices include multiple cameras with different fields of view based on a curvature of a camera lens directing light to the image sensor. Some devices include a software implemented panorama function using a single image sensor. When the user selects the function, the camera captures an image of the camera's current field of view. The user rotates the device (such as moving his or her arms from left to right) to rotate the camera's field of view, and the camera continues to capture images during the rotation. After capture, the device stitches together the sequence of frames to generate a panorama image.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to using multiple image sensors to generate wide angle images. An example device includes a memory and one or more processors. The one or more processors are configured to receive a first image frame of a scene captured by a first image sensor. The one or more processors are also configured to receive a second image frame of the scene captured by a second image sensor. The second image frame is captured concurrently with capture of the first image frame. The one or more processors are also configured to receive a third image frame of the scene captured by a third image sensor. The third image frame is captured concurrently with capture of the first image frame. The one or more processors are also configured to generate a combined image from the first image frame, the second image frame, and the third image frame. The combined image includes a first field of view that is wider than a field of view of the first image frame.

An example method includes receiving a first image frame of a scene captured by a first image sensor including a first field of view. The method also includes receiving a second image frame of the scene captured by a second image sensor including a second field of view. The second image frame is captured concurrently with capture of the first image frame. The method also includes receiving a third image frame of the scene captured by a third image sensor including a third field of view. The third image frame is captured concurrently with capture of the first image frame. The method also includes generating a combined image from the first image frame, the second image frame, and the third image frame. The combined image includes a first field of view that is wider than a field of view of the first image frame.

An example non-transitory, computer-readable medium stores instructions that, when executed by one or more processors of a device, cause the device to receive a first image frame of a scene captured by a first image sensor. Execution of the instructions also causes the device to receive a second image frame of the scene captured by a second image sensor. The second image frame is captured concurrently with capture of the first image frame. Execution of the instructions also causes the device to receive a third image frame of the scene captured by a third image sensor. The third image frame is captured concurrently with capture of the first image frame. Execution of the instructions also causes the device to generate a combined image from the first image frame, the second image frame, and the third image frame. The combined image includes a first field of view that is wider than a field of view of the first image frame.

Another example device includes means for receiving a first image frame of a scene. The device also includes means for receiving a second image frame of the scene. The second image frame is captured concurrently with capture of the first image frame. The device also includes means for receiving a third image frame of the scene. The third image frame is captured concurrently with capture of the first image frame. The device also includes means for generating a combined image from the first image frame, the second image frame, and the third image frame. The combined image includes a first field of view that is wider than a field of view of the first image frame.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 13 is an illustrative flow chart of an example operation for generating a combined image from multiple image frames.

FIG. 14 is an illustrative flow chart of an example operation for capturing multiple image frames to be combined to generate a combined image frame.

DETAILED DESCRIPTION

Aspects of the present disclosure may be used for image or video capture devices. Some aspects include generating wide angle images using multiple image sensors.

A smartphone, tablet, digital camera, or other device includes a camera to capture images or video of a scene. The camera has a maximum field of view based on an image sensor and one or more focus lenses. However, many users want to capture images or video of a field of view of a scene larger than the field of view of the camera. Some devices include multiple cameras with different fields of view based on curvatures of the focus lenses, allowing a user to select the camera with the preferred field of view for capturing images or video. For example, some smartphones include a telephoto angle camera, a wide angle camera, and an ultra-wide angle camera with different fields of view. Before capture, the user may select which camera to use based on the field of view of each camera.

However, the ultra-wide angle camera may have a field of view that is less than a desired field of view of the scene to be captured. To increase the field of view, device manufacturers may increase the curvature of a camera lens. However, the device manufacturer may need to increase the size and complexity of the image sensor to compensate. Additionally, the lens curvature introduces distortion into the captured frames.

Figure 1:
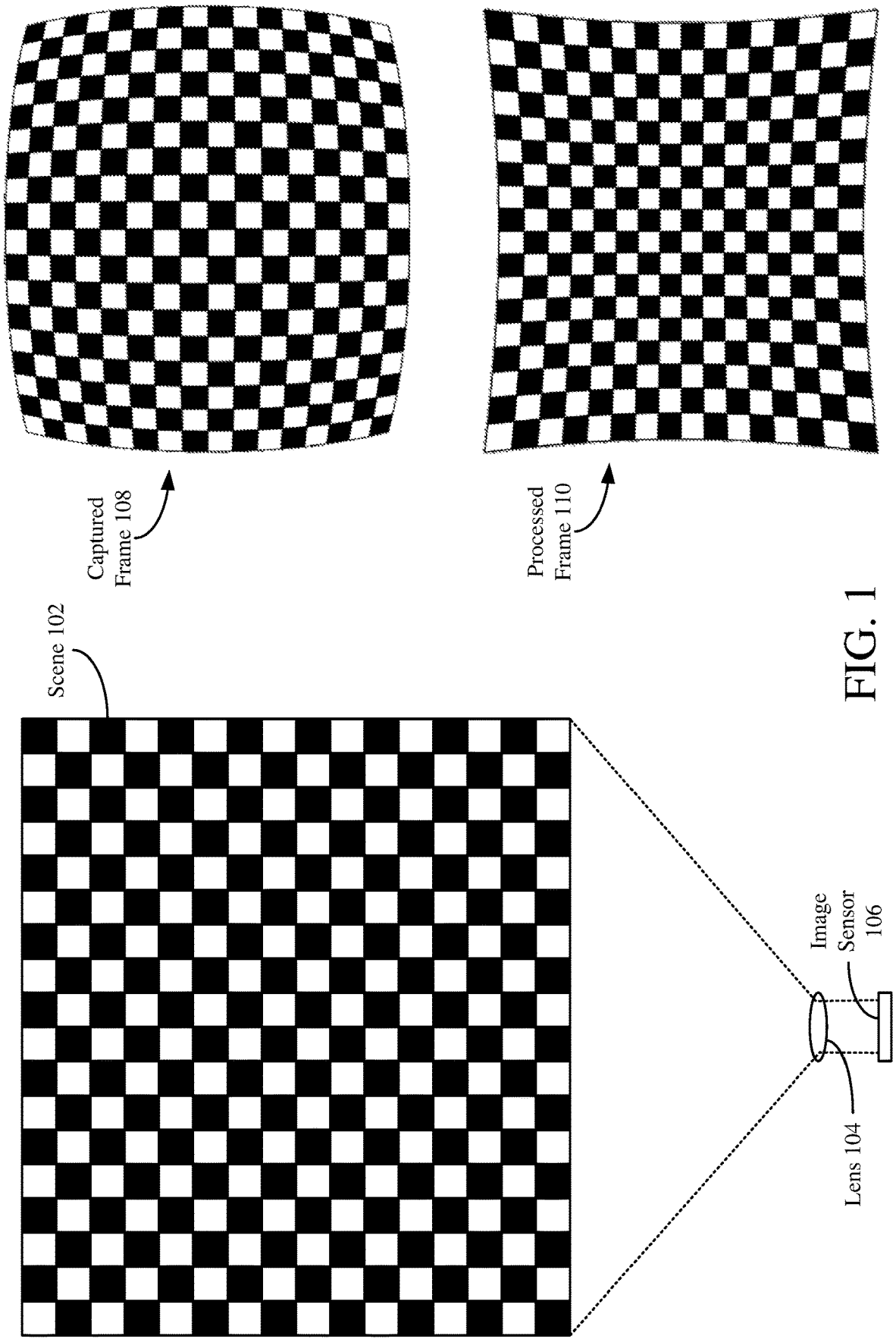
FIG. 1 is a depiction of an example distortion during an image capture based on a camera lens curvature.

FIG. 1 is a depiction 100 of an example distortion during an image capture based on a curvature of the lens 104. The lens 104 directs light from the scene 102 to the image sensor 106, and the image sensor 106 captures one or more image frames. Captured frame 108 is an example frame captured by the image sensor 106 of scene 102. The captured frame 108 includes a barrel distortion. As shown. the center of the scene 102 may be stretched in frame 108 with reference to the edges of the scene, and the corners of the scene 102 may be pinched toward the center. A device may process the captured frame 108 to reduce the barrel distortion, but the processing may create its own distortion effects on the frame 108. For example, the center of the scene 102 in the captured frame 108 may be normalized or otherwise adjusted with reference to the edges of the scene in the captured frame 108. Adjusting the center may include stretching the corners of the scene in the captured frame 108 to more closely resemble a rectangle (or the shape of the image sensor if different than a rectangle). Stretching the corners in processing the frame 108 may introduce a pin cushion distortion, as shown in processed frame 110.

The lens curvature increases in order to increase the field of view for captured frames by the image sensor 106. As a result, the distortion increases in the captured frames (such as an increased barrel distortion) and the processed images (such as an increased pincushion distortion). Therefore, any image generated (including images with smaller intended fields of view) is distorted by the increased lens curvature.

Some devices also include a software function to generate images with a wide field of view. For example, some camera applications include a wide angle image capture mode (which may be labelled a "panorama mode") to generate images with wide fields of view. For a wide angle image capture mode (such as a panorama mode), a user moves a image sensor while the image sensor captures a sequence of frames until all of a scene is included in at least one of the frames. The frames are then stitched together to generate the wide angle image.

Figure 2:
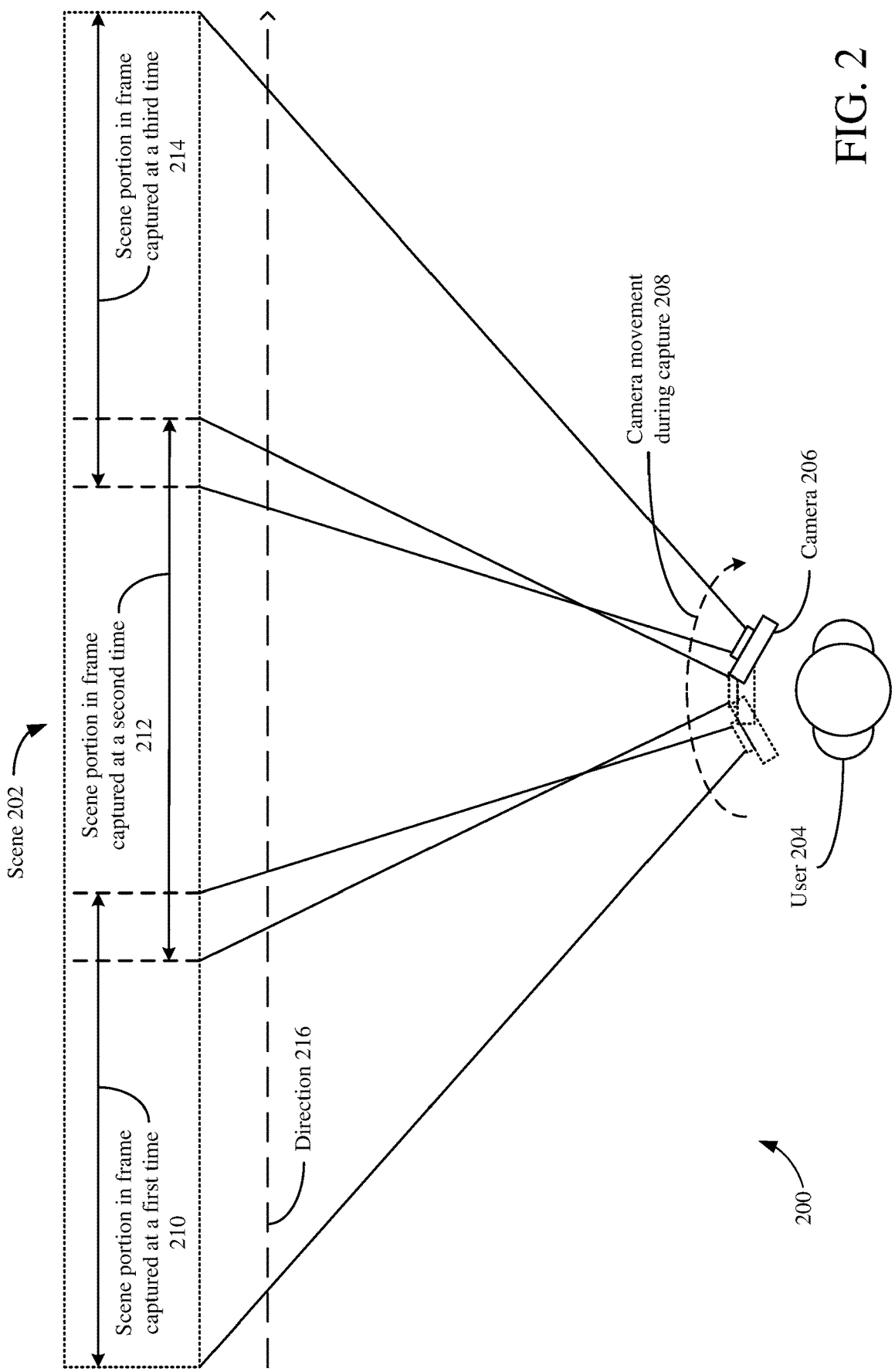
FIG. 2 is a depiction of an example wide angle image capture based on a sequence of captures by a camera.

FIG. 2 is a depiction 200 of an example wide angle image capture of a scene 202 based on a sequence of captures by a camera 206 including one image sensor. The user 204 wishes to capture an image of the scene 202, but the field of view of the scene 202 is greater than the field of view of the camera 206. Therefore, the user 204 places the camera 206 in a wide angle image capture mode (such as a panorama mode). The user 204 positions the camera 206 so that the field of view of the camera is toward scene portion 210. The user 204 instructs the camera 206 to begin frame capture (such as by pressing a shutter button), and the camera 206 captures a first frame with the scene portion 210. The user 204 moves the camera 206 (such as along the camera movement arc 208) to move the camera's field of view of the scene 102 along direction 216. After capturing the first frame, the camera 206 captures a second frame of the scene portion 212. The user continues to move the camera 206, and the camera 206 captures a third frame of the scene portion 214. After panning the camera 206 across the scene 202 during frame capture, the user 204 may stop the frame captures (such as by again pressing a shutter button). After capture of the sequence of frames, the sequence of frames may be stitched together to generate a wide angle image of the scene 102. For example, the first frame of the scene portion 210, the second frame of the scene portion 212, and the third frame of the scene portion 214 (captured at different times) are stitched together to generate a wide angle image of the entire scene 202.

Since a sequence of frames are captured over a period of time when the camera 206 is moving, the wide angle capture mode may be limited to generating still images (and not video since a succession of wide angle images cannot be generated). Additionally, the camera 206 being moved and the time lapse in capturing the sequence of image frames introduces one or more distortions into a generated image. Example distortions include ghosting distortions and stitching distortions. A ghosting distortion is an effect where multiple instances of a single object may appear in a final image. A ghosting distortion may be a result of local motion in the scene 202 during the sequence of frame captures. A stitching distortion is an effect where edges may be broken or objects may be split, warped, overlaid, and so on where two image frames are stitched together. A stitching distortion may be a result of global motion (which also includes a change in perspective of the camera when capturing the sequence of frames).

Figure 3:
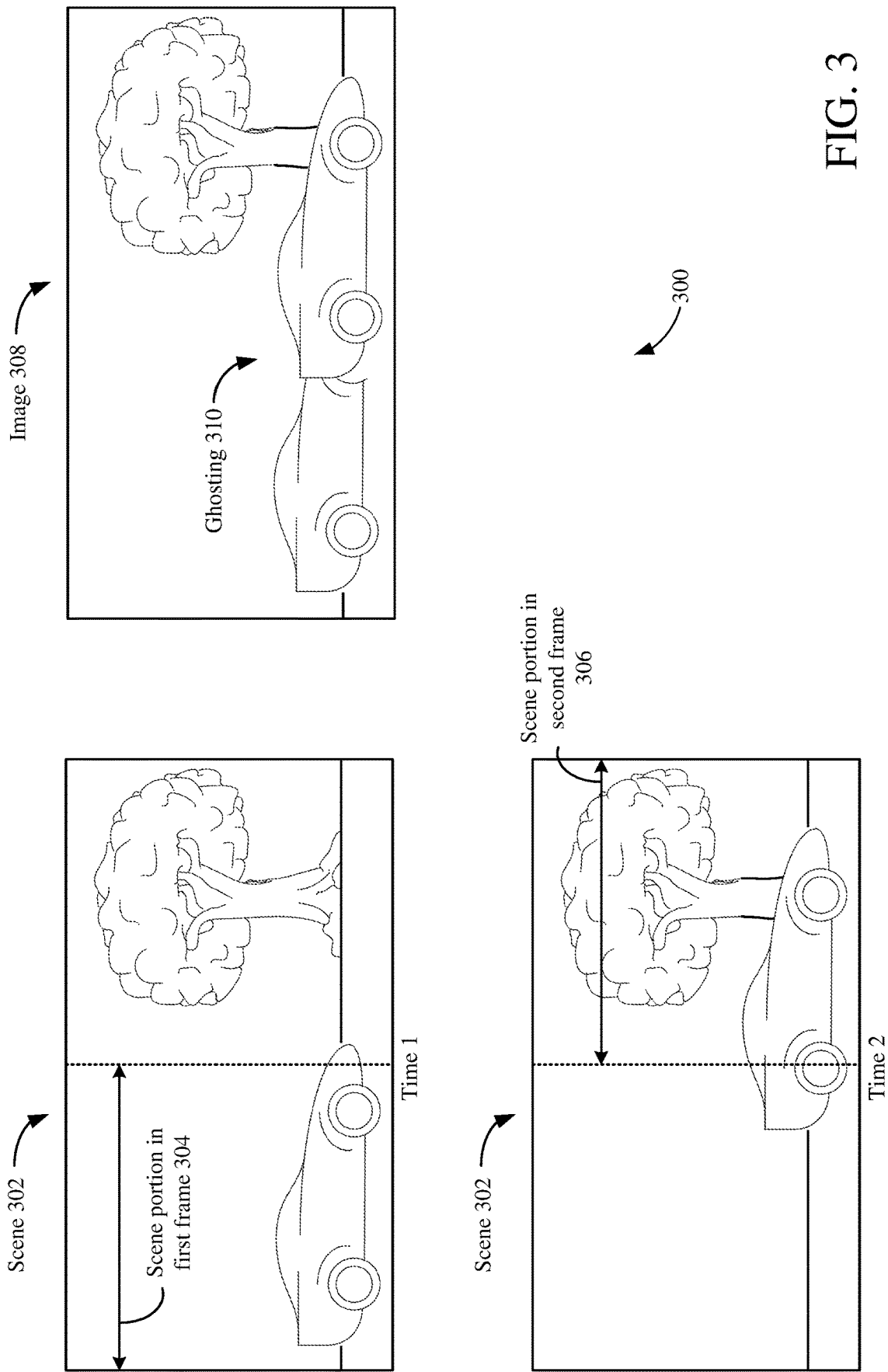
FIG. 3 is a depiction of an example ghosting distortion in a wide angle image.

FIG. 3 is a depiction 300 of an example ghosting distortion 310 in a wide angle image using the wide angle capture operation illustrated in FIG. 2. A device, in a wide angle capture mode, is to generate an image of the scene 302. The user positions the device so that the device's camera captures a first frame including scene portion 304 at a time 1. The user moves the device so that the device's camera captures a second frame including the scene portion 306 at a time 2. The scene 302 includes a car moving from left to right in the scene 302. As a result of the car moving in scene 302, the first frame includes a substantial portion of the car also included in the second frame. When the two frames are stitched together, the car may appear as multiple cars or portions of cars (illustrated as ghosting distortion 310) in the resulting image 308.

Figure 4:
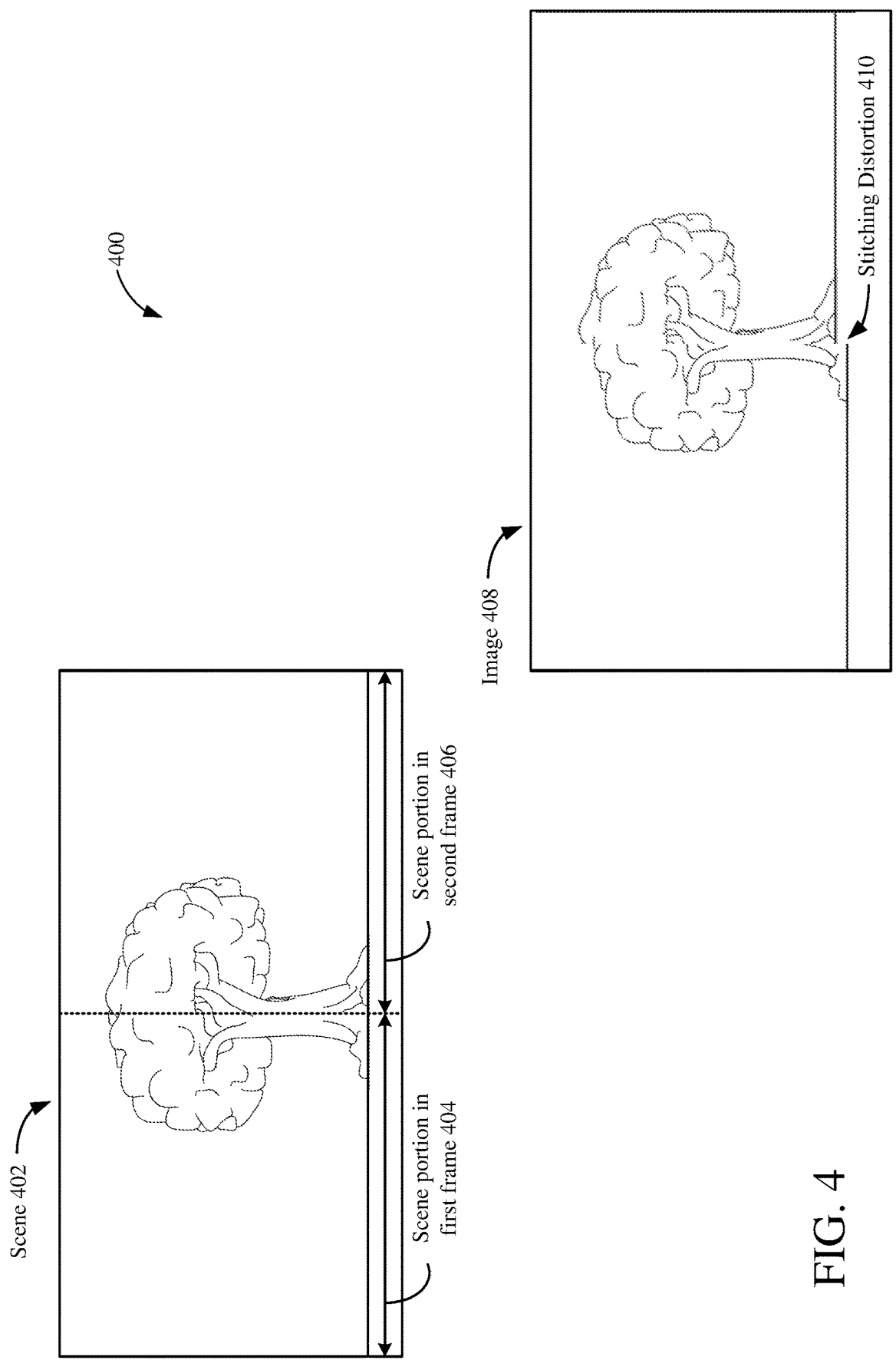
FIG. 4 is a depiction of an example stitching distortion in a wide angle image.

FIG. 4 is a depiction 400 of an example stitching distortion 410 in a wide angle image using the wide angle capture operation illustrated in FIG. 2. A device, in a wide angle capture mode, is to generate an image of the scene 402. The user positions the device so that the device's camera captures a first frame including scene portion 404 at a first time. The user moves the device so that the device's camera captures a second frame including the scene portion 406 at a second time. As a result of the camera moving during between captures or the change in perspective of the first frame and the second frame of the scene 402, there may exist artifacts or distortions when the two frames are stitched together. For example, the image 408 is generated by stitching the first frame and the second frame together. As shown, a stitch distortion 410 exists where a left portion of the tree does not align with a right portion of the tree. While the example stitching distortion 410 is illustrated as a lateral displacement between the portions of the scene captured in the two frames, the stitching distortion 410 may also include a rotational displacement or warping caused by attempts to align the frames during stitching. In this manner, straight lines in the scene may appear to break at an angle in a final image, lines may appear curved near a stitch, or objects may otherwise appear warped on one side of the stitch compared to the other side as a result of a rotation.

Another example distortion is a perspective distortion. Referring back to FIG. 2, the perspective of the camera 206 is from the right of the scene portion 210, and the perspective of the camera 206 is from the left of the scene portion 214. Therefore, horizontal edges (such as a horizon) may appear slanted in one direction in the first image frame, and the same horizontal edges (such as the horizon) may appear slanted in the opposite direction in the third image frame. A final image from the image frames stitched together may connect the opposite slanted edges via an arc. For example, a horizon in images from a panorama mode appears curved. Such curvature is an example of a perspective distortion. To exacerbate the perspective distortion, the perspective varies based on the camera movement, which is not consistent between different instances of generating a wide angle image. As a result, the camera perspectives during one sequence of frame captures differs from the camera perspectives during other sequences of frame captures.

Distortions caused by increasing a lens curvature to increase a field of view reduces the quality of the resulting images, which negatively impacts the user experience. Furthermore, distortions caused by capturing a sequence of frames to generate a wide angle image reduces the quality of the resulting images, which negatively impacts the user experience. Additionally, a wide angle capture mode requiring capture of a sequence of frames while moving an image sensor may prevent video capture. Therefore, what is needed is means for generating wide angle images or video that prevent or reduce the above described distortions.

In some implementations, multiple image sensors are used to capture frames concurrently. The frames are then stitched together to generate a combined image with a field of view greater than the field of view of any one image sensor. In this manner, a device including the multiple image sensors is not required to be moved and a sequence of frames is not required to be captured. As a result, no distortions caused by a time lapse in capturing a sequence of frames or caused by a movement of the device is introduced into the generated wide angle images. The multiple image sensors may be positioned with reference to one another to capture a desired field of view of a scene at one time. Since the position of the image sensors with reference to one another is known, the device including the image sensors may be configured to reduce or remove perspective distortions. Additionally, since the multiple image sensors capture image frames concurrently (and not require a sequence of frames), a device may be configured to capture and generate a wide angle video that includes a succession of wide angle images.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device including or coupled to multiple image sensors capable of capturing images or video (such as security systems, smartphones, tablets, laptop computers, digital video and/or still cameras, and so on). The terms "device" and "apparatus" are not limited to one or a specific number of physical objects (such as one smartphone, one camera controller, one processing system and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

Figure 5:
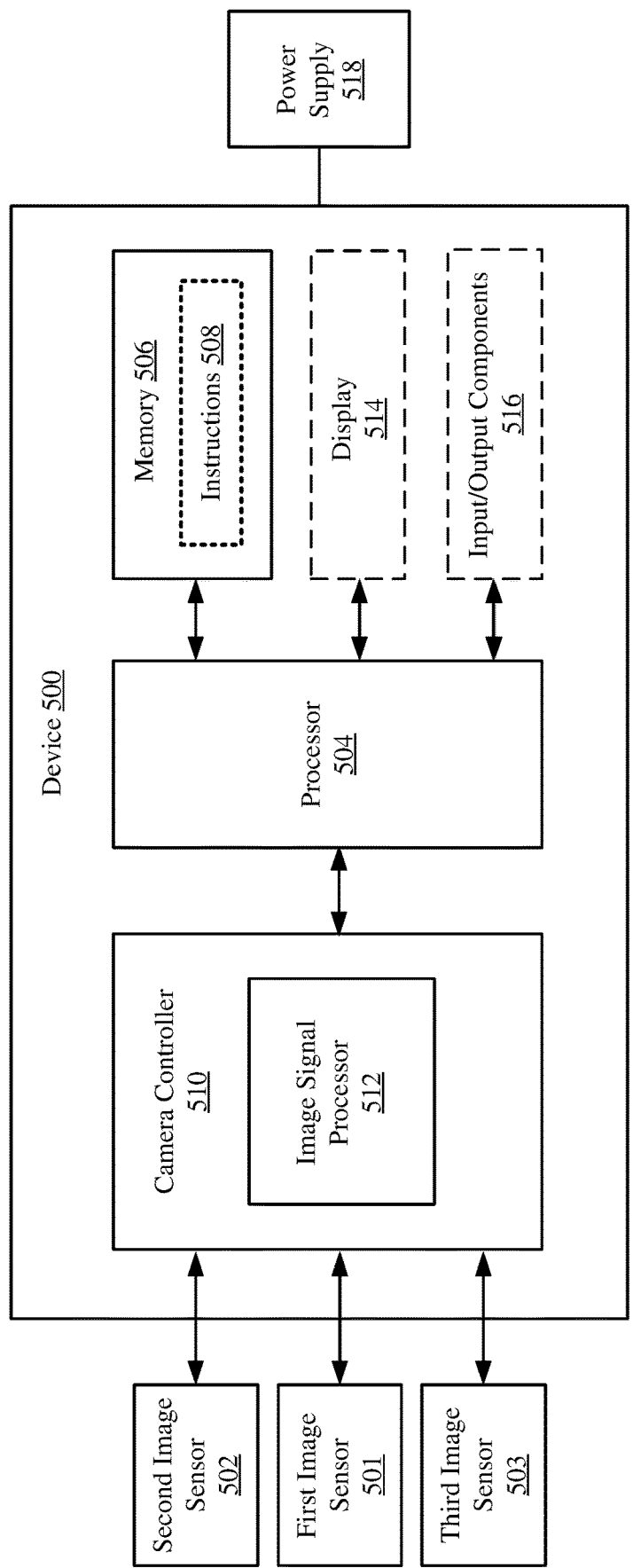
FIG. 5 is a block diagram of an example device configured to generate one or more wide angle images.

FIG. 5 is a block diagram of an example device 500 configured to generate one or more wide angle images. The example device 500 includes or is coupled to a first image sensor 501, a second image sensor 502, and a third image sensor 503. The image sensors 501-503 may be included in a single camera module or may be part of separate camera modules for the device 500. In the example of a smartphone or tablet, the image sensors 501-503 may be positioned on a same side of the device to capture frames of a scene. For example, a smartphone may include the three image sensors on a side opposite of a display or on a side including the display. The image sensors 501-503 may be positioned with reference to one another to allow capture of a scene with a field of view greater than the field of view of the first image sensor 501. In some implementations, the image sensors 501-503 may be similar to one another. For example, a same model image sensor may be used for each of the image sensors 501-503. In some other implementations, the image sensors 501-503 may differ from one another. For example, the first image sensor 501 may include a greater pixel density or more pixels than image sensors 502 and 503. In this manner, the first image sensor 501 may be the primary image sensor used for all imaging. In some implementations, the second image sensor 502 may be similar to the third image sensor 503 for generating wide angle images, but the image sensors 502 and 503 may be different than the first image sensor 501 used for all imaging. While the examples below are with reference to the example implementation of similar image sensors 501-503, any suitable types or configurations of image sensors may be used. The device 500 may also include one or more lenses, one or more apertures, one or more shutters, or other suitable components that are associated with the image sensors 501-503. The device 500 may also include a flash, a depth sensor, or any other suitable imaging components. While three image sensors are illustrated as part of the device 500, the device 500 may include or be coupled to additional image sensors not shown. In this manner, wide angle imaging may include the use of more than three image sensors (such as 5, 7, or 9 image sensors). The device 500 may also include an even number of image sensors to be used for wide angle imaging. The three image sensor are illustrated for the examples below for clarity in explaining aspects of the disclosure, but the disclosure is not limited to the specific examples of using three image sensors.

The example device 500 also includes a processor 504, a memory 506 storing instructions 508, and a camera controller 510. In some implementations, the device 500 may include a display 514 and a number of input/output (I/O) components 516. The device 500 may also include additional features or components not shown. In one example, a wireless interface, which may include a number of transceivers and a baseband processor, may be included for a wireless communication device. In another example, one or more motion sensors (such as a gyroscope) and a sensor controller may be included in a device.

The memory 506 may be a non-transient or non-transitory computer readable medium storing computer-executable instructions 508 to perform all or a portion of one or more operations described in this disclosure. In some implementations, the instructions 508 include instructions for operating the device 500 in a wide angle capture mode using the image sensors 501-503. The instructions 308 may also include other applications or programs executed by the device 500, such as an operating system, a camera application, or other applications or operations to be performed by the device 500.

The processor 504 may be one or more suitable processors capable of executing scripts or instructions of one or more software programs (such as instructions 508) stored within the memory 506. In some aspects, the processor 504 may be one or more general purpose processors that execute instructions 508. For example, the processor 504 may be an applications processor and execute a camera application. In some implementations, the processor 504 is configured to instruct the camera controller 510 to perform one or more operations with reference to the image sensors 501-503. In additional or alternative aspects, the processor 504 may include integrated circuits or other hardware to perform functions or operations without the use of software.

While shown to be coupled to each other via the processor 504 in the example of FIG. 5, the processor 504, the memory 506, the camera controller 510, the optional display 514, and the optional I/O components 516 may be coupled to one another in various arrangements. For example, the processor 504, the memory 506, the camera controller 510, the optional display 514, and/or the optional I/O components 516 may be coupled to each other via one or more local buses (not shown for simplicity).

If the device 500 includes a display 514, the display 514 may be any suitable display or screen allowing for user interaction and/or to present items for viewing by a user (such as captured images, video, or preview images from one or more of the image sensors 501-503). In some aspects, the display 514 is a touch-sensitive display. The optional I/O components 516 may include any suitable mechanism, interface, or device to receive input (such as commands) from the user and to provide output to the user. For example, the I/O components 516 may include a graphical user interface, keyboard, mouse, microphone and speakers, a squeezable bezel, one or more buttons (such as a power button), a slider, or a switch.

The camera controller 510 may include an image signal processor 512, which may be one or more image signal processors to process captured image frames provided by the one or more image sensors 501-503. In some example implementations, the camera controller 510 (such as the image signal processor 512) may also control operation of the image sensors 501-503. For example, the camera controller 510 (such as the image signal processor 512) may receive instructions from the processor 504 to perform wide angle imaging, and the camera controller 510 may initialize the image sensors 501-503 and instruct the image sensors to capture one or more frames for wide angle imaging. The camera controller 510 may control other aspects of the image sensors 501-503, such as operations for performing one or more of automatic white balance, automatic focus, or automatic exposure operations.

In some aspects, the image signal processor 512 includes one or more processors configured to execute instructions from a memory (such as instructions 508 from the memory 506, instructions stored in a separate memory coupled to the image signal processor 512, or instructions provided by the processor 504). For example, the image signal processor 512 may execute instructions to process frames from the image sensors 501-503 to generate a wide angle image. In addition or alternative to the image signal processor 512 including one or more processors configured to execute software, the image signal processor 512 may include specific hardware to perform one or more operations described in the present disclosure. The image signal processor 512 alternatively or additionally may include a combination of specific hardware and the ability to execute software instructions. While the following examples for performing wide angle imaging or image capture are described with reference to the example device 500 in FIG. 5, any suitable device or apparatus may be used. For example, the device performing wide angle imaging may be a portion of the device 500 (such as a system on chip or components of an imaging processing pipeline).

The device 500 is configured to generate one or more wide angle images using the image sensors 501-503. For example, the image sensors 501-503 are configured to capture image frames concurrently, and the device 500 (such as the image signal processor 512) is configured to process the image frames to generate a wide angle image. As used herein, a wide angle image refers to an image with a wider field of view than the first image sensor 501. In some implementations, the wide angle image may have a wider field of view than each of the image sensors 501-503. In processing the image frames, the device 500 combines the image frames to generate the wide angle image (which may also be referred to as a combined image). Processing may also include reducing distortions in the image frames for the combined image (such as reducing perspective distortions).

In some implementations, the image sensors 501-503 are configured to capture image frames to appear as if the image sensors 501-503 border one another. In some implementations, a first image sensor 501 and a second image sensor 502 may conceptually be aligned and at an angle from one another to capture different portions of a scene. For example, if a smartphone is in a landscape mode, the first image sensor 501 and the second image sensor 502 may conceptually be neighboring each other horizontally and offset from each other by an angle. The first image sensor 501 may capture a right portion of the scene with reference to the scene portion in the captures from the second image sensor 502.

Figure 6:
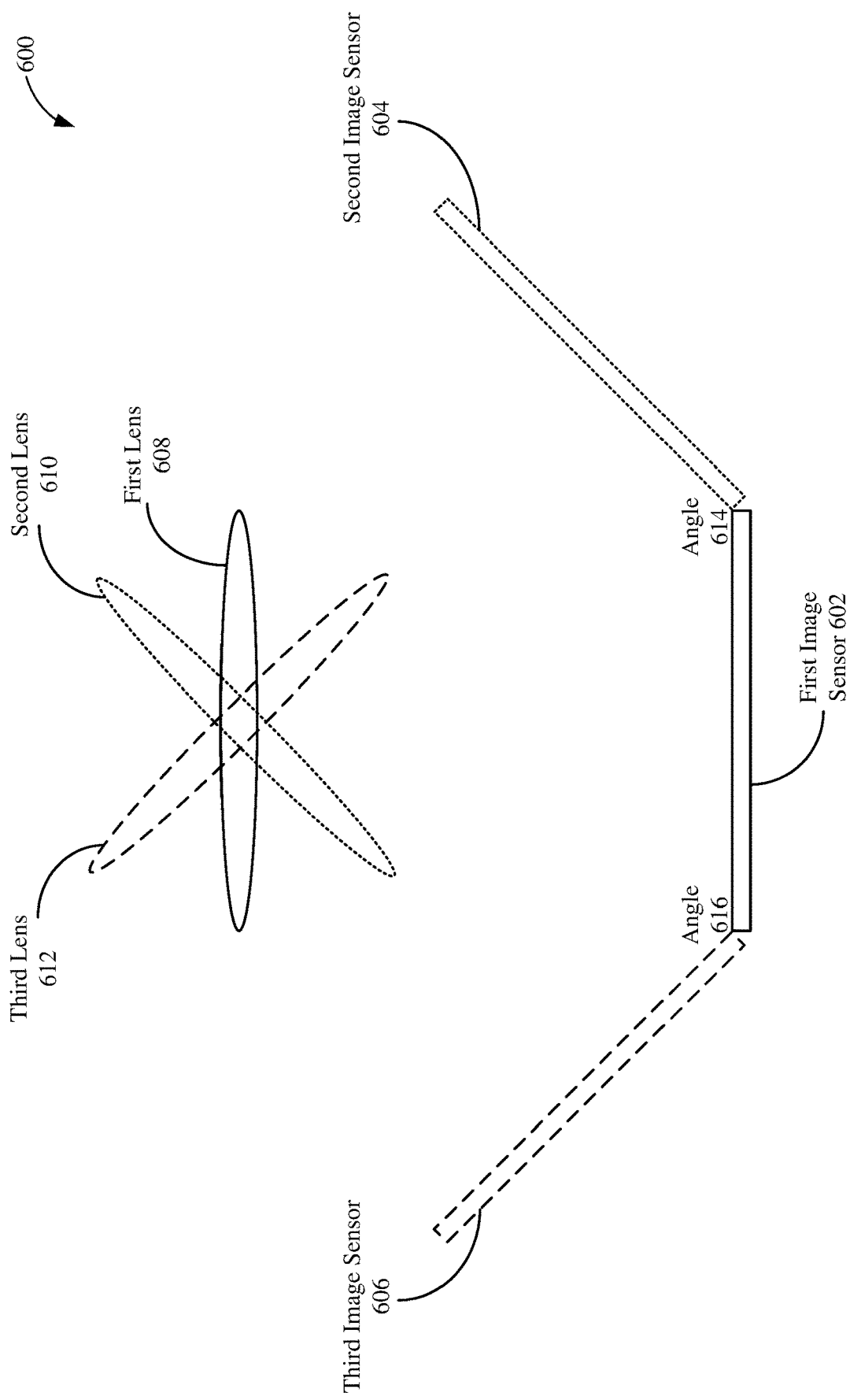
FIG. 6 is a conceptual depiction of at least three image sensors and their associated lenses for capturing image frames.

FIG. 6 is a conceptual depiction 600 of a first image sensor 602, a second image sensor 604, and a third image sensor 606. The conceptual depiction 600 may be an example conceptual configuration of the image sensors 501-503 of the device 500. The conceptual depiction also illustrates a first lens 608 associated with the first image sensor 602, a second lens 610 associated with the second image sensor 604, and a third lens 612 associated with the third image sensor 606. The first lens 608 is configured to direct light from a first portion of the scene to the first image sensor 602, the second lens 610 is configured to direct light from a second portion of the scene to the second image sensor 604, and the third lens 612 is configured to direct light from a third portion of the scene to the third image sensor 606. If the image sensors 602-606 are positioned in a horizontal manner (as illustrated), the first image sensor 602 is configured to capture a center portion of a scene, the second image sensor 604 is configured to capture a left portion of the scene, and the third image sensor 606 is configured to capture a right portion of the scene. In some implementations, the field of view of the first image sensor 602 overlaps the field of view of the second image sensor 604 and the field of view of the third image sensor 606. For example, a left edge of the first image sensor's field of view may overlap a right edge of the second image sensor's field of view, and a right edge of the first image sensor's field of view may overlap a left edge of the third image sensor's field of view in the depiction 600.

The maximum field of view of a combined image depends on the angles 614 and 616 between the image sensors 602-606. For example, if the angle 614 is decreased, more of the left portion of the scene is included in the frames captured by the second image sensor 604. In contrast, if the angle 614 is increased, less of the left portion of the scene is included in the frames captured by the second image sensor 604. Similarly, if the angle 616 is decreased, more of the right portion of the scene is included in the frames captured by the third image sensor 606. In contrast, if the angle 616 is increased, less of the right portion of the scene is included in the frames captured by the second image sensor 606. The angles 614 and 616 are between 90 degrees and 180 degrees (such as 135 degrees).

Many wide angle images include an object of interest towards the center of the image. In the conceptual depiction 600, a center of a wide angle image is captured by the first image sensor 602 (which is positioned to capture a center of the scene). In this manner, the object of interest is not near the edges of the image frames that may be susceptible to errors (such as stitching errors) when combining the image frames. For example, referring back to FIG. 4, the first image sensor 602 may be configured to capture the center of the scene 402 including the tree. In this manner, a stitching error through the tree does not exist in the wide angle image after combining the image frames. If the configuration of image sensors includes an odd number of image sensors (such as 3, 5, 7, or so on), an image sensor may be configured to be a center image sensor to capture a center of the scene, and an equal number of image sensors may be positioned on both sides of the center image sensor. While three image sensors are depicted in the examples, any number of image sensors may be included in the configuration (such as 3 or more).

Some configurations may include an even number of image sensors, and one image sensor may be configured to capture a center of the scene. In this manner, less image sensors are positioned on one side of the image sensor than the other side. In some implementations, the angles between the side positioned image sensors may be configured so that the field of view to one side of the scene center (such as the left of center) substantially equals the field of view to the opposite side of the scene center (such as the right of center) in the wide angle image. For example, the fewer image sensors to one side may be associated with smaller angles between the image sensors to increase the field of view without increasing the number of image sensors. However, any suitable angles may be used, and the angles may be the same or different. In some implementations, the angle 614 is the same as the angle 616.

Since the first image sensor 602 is configured to capture the center of the scene in the wide angle image, the perspective of the wide angle image may be generated to be similar to the perspective of the image frames captured by the first image sensor 604. Since the angles 614 and 616 are not 180 degrees (the image sensor 604 and 606 are not parallel to the first image sensor 602), the frames captured by the image sensors 604 and 606 include perspective distortions with reference to the perspective of the frames captured by the first image sensor 602. Image frames captured by the second image sensor 604 include a perspective distortion corresponding to the angle 614, and image frames captured by the third image sensor 606 include a perspective distortion corresponding to the angle 616. As the angle 614 or 616 increases towards 180 degrees (with the corresponding image sensors approaching being parallel to one another), the perspective distortion decreases (as the maximum field of view of the wide angle image decreases). As the angle 614 or 616 decreases towards 90 degrees (with the corresponding image sensors approaching being parallel to one another), the perspective distortion decreases (as the maximum field of view of the wide angle image decreases).

The device 500 may be configured to reduce a perspective distortion with more success using the conceptual configuration 600 than using a single image sensor in a panorama mode (such as depicted in FIG. 2). The angles 614 and 616 between the image sensors 602-606 are static. In the configuration 600, the device 500 may reduce perspective distortion physically during capture (such as adjusting the direction of light to the second image sensor 604 and the third image sensor 606). In addition or to the alternative, the device 500 may process the captured frames to reduce perspective distortion based on the corresponding angle. For example, the device 500 may perform perspective distortion correction as a predefined filter (such as in the image signal processor 512) that is configured based on the angle between the capturing image sensor 604 or 606 and the first image sensor 602. In contrast, angles between instances of an image sensor (for a panorama mode using one image sensor) when being moved between frame captures may vary depending on the device movement. Therefore, a device using a panorama mode cannot use a predefined filter based on a static angle to remove perspective distortion (since the static angle does not exist).

As shown in the conceptual depiction 600, each image sensor 602-606 has the same focal length, as depicted by the lenses 608-612 being centered at the same point. In this manner, the range of depths of the scene in focus is the same for each of the image sensors 602-606. However, three separate objects (such as the three lenses) may not physically occupy the same space. In some implementations, a prism may be configured to perform the functions of the three lenses 608-612. For example, a prism may be shaped to direct light from a first direction to the first image sensor 602, direct light from a second direction to the second image sensor 604, and direct light from a third direction to the third image sensor 606.

In some other implementations, the image sensors may be configured to spatially separate the image sensors from one another. For example, a mirror may be used to direct light toward one of the image sensors 604 or 606. Based on the position of a mirror, the second image sensor 604 or the third image sensor 606 may be spatially separated from the first image sensor 602 while still capturing image frames that conform to the conceptual depiction 600 of the image sensors 602-606 in FIG. 6. In this manner, the associated lens 610 or 612 may be positioned at a different location than the first lens 608. In some implementations, the second image sensor 604 may be associated with a first mirror, and the third image sensor 606 may be associated with a second mirror. As used herein, a mirror may refer to any suitable reflective surface (such as a reflective coating, mirrored glass, and so on).

Figure 7:
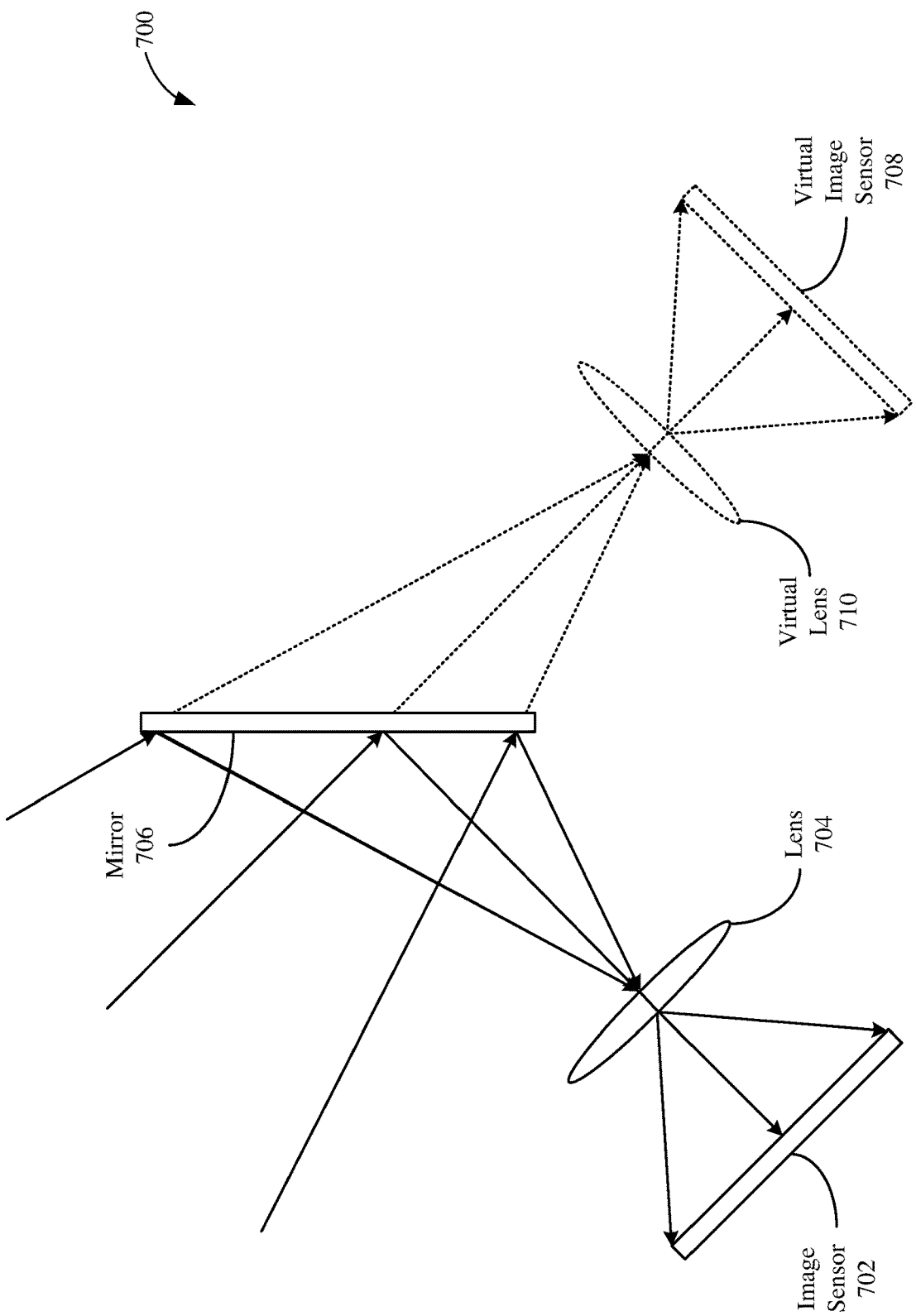
FIG. 7 is a conceptual depiction of a mirror directing light to an image sensor and the change in position of the image sensor based on the mirror.

FIG. 7 is a conceptual depiction 700 of a mirror 706 directing light to an image sensor 702 and the change in position of the image sensor 702 based on the mirror 706. If the mirror 706 does not exist, the light would travel to a location of the virtual lens 710, and the virtual lens 710 would direct the light to the virtual image sensor 708. For example, referring back to FIG. 6, the light to be directed to the second image sensor 604 approaches the second lens 610. Referring back to FIG. 7, if a mirror 706 is used to direct light to the image sensor 702, the image sensor 702 is positioned as depicted in FIG. 7 instead of at the position of the virtual image sensor 708 for the image sensor 702 to capture the same image frame. Additionally, the location of the lens 704 is as depicted in FIG. 7 instead of at the position of the virtual lens 710.

Figure 8:
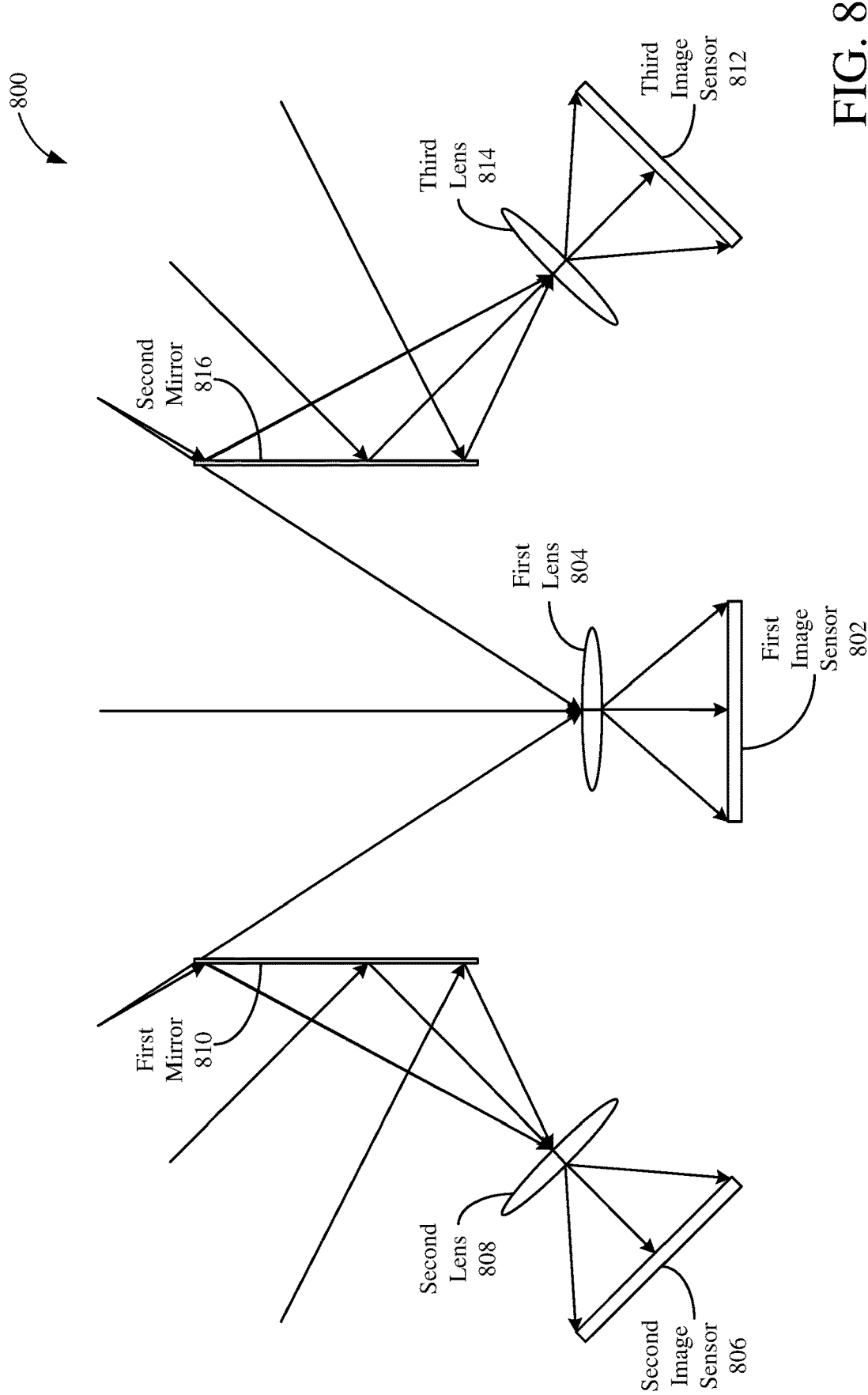
FIG. 8 is a depiction of an example configuration of three image sensors to generate a wide angle image using mirrors.

FIG. 8 is a depiction 800 of an example configuration of three image sensors 802, 806, and 812 to generate a wide angle image using mirrors 810 and 816. In comparing the depiction 800 to the conceptual depiction 600 in FIG. 6, the first image sensor 802 is configured to capture the center of a scene, similar to the first image sensor 602. The second image sensor 806 (associated with the first mirror 810) is on the left side of the first image sensor 802 (in contrast to the second image sensor 604 being to the right of the first image sensor 602), but the second image sensor 806 is configured to capture the left portion of the scene similar to the second image sensor 604. Additionally, the second image sensor 806 is spatially separated from the first image sensor 802. In this manner, the second lens 808 and the first lens 804 may be positioned without being collocated. In some implementations, the lenses 804 and 808 are positioned so that the first image sensor 802 and the second image sensor 806 are associated with the same focal length.

The third image sensor 812 (associated with the second mirror 816) is on the right side of the first image sensor 802 (in contrast to the third image sensor 606 being to the left of the first image sensor 602), but the third image sensor 812 is configured to capture the right portion of the scene similar to the third image sensor 606. Additionally, the third image sensor 812 is spatially separated from the first image sensor 802. In this manner, the third lens 814 and the first lens 804 may be positioned without being collocated. In some implementations, the lenses 804 and 814 are positioned so that the first image sensor 802 and the third image sensor 812 are associated with the same focal length.

In some implementations, the spacing between the first mirror 810 and the second mirror 816 is sufficient to not obstruct a field of view of the first image sensor 802. In this manner, light from a center portion of a scene may pass between the mirrors 810 and 816 and toward the first lens 804. The first mirror 810 may be positioned to direct light from a left portion of the scene to the second lens 808 so that the second image sensor 806 captures image frames with a similar perspective and field of view as the second image sensor 604 in FIG. 6. The second mirror 816 may be positioned to direct light from a right portion of the scene to the third lens 814 so that the third image sensor 812 captures image frames with a similar perspective and field of view as the third image sensor 606 in FIG. 6. Similar to the conceptual depiction 600 in FIG. 6, the field of view of the first image sensor 802 may overlap the field of view of the second image sensor 806 and the field of view of the third image sensor 812. A mirror may refer to any suitable reflective surface. For example, a mirror may be a coated glass or other material, or a material with light reflective properties.

Since the image sensors 802, 806, and 812 are configured to capture an image frame concurrently, local motion and global motion is reduced (thus reducing distortions in a generated wide angle image). Additionally, since the angles between the image sensors 802, 806 and 812 are static, a device may be configured to reduce perspective distortion based on the known angles. In some implementations, light to the second image sensor 806 and light to the third image sensor 812 may be refracted to reduce a perspective distortion. Refraction may alternatively or additionally be used to adjust a field of view of the second image sensor 806 or the third image sensor 812. For example, the field of view may be widened to widen the field of view of the wide angle image. In another example, the field of view may be shifted to allow for different spacings between the image sensors 802, 806 and 812. For example, refraction may be used to allow further separation between the second image sensor 806 and the first image sensor 802 and may be used to allow further separation between the third image sensor 812 and the first image sensor 802. In some implementations, one or more prisms may be configured to refract light to the second image sensor 806 or the third image sensor 812.

Figure 9:
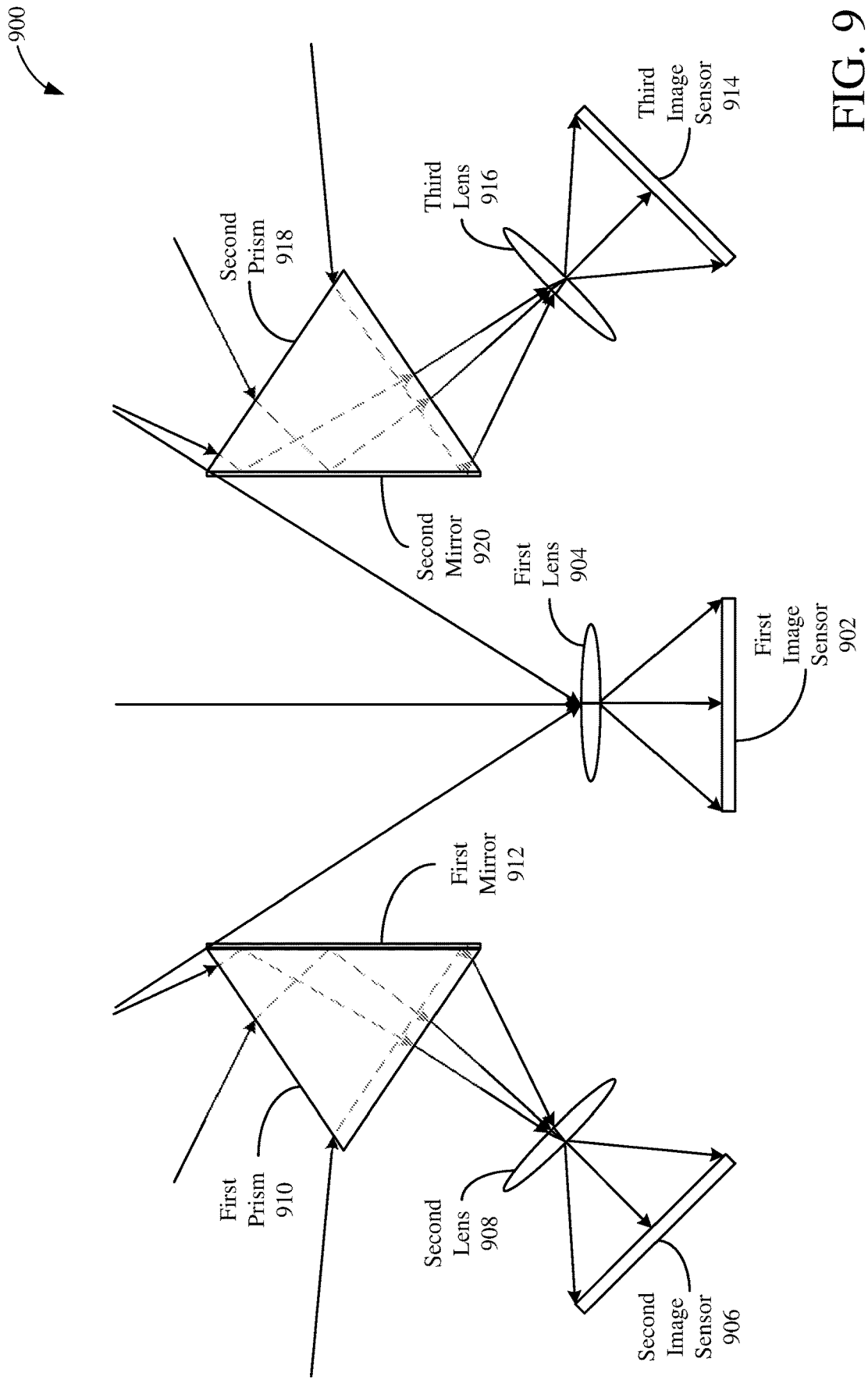
FIG. 9 is a depiction of an example configuration of three image sensors to generate a wide angle image using prisms.

FIG. 9 is a depiction 900 of an example configuration of three image sensors 902, 906, and 914 to generate a wide angle image using prisms 910 and 918. In the depiction 900, the first prism 910 is configured to refract light directed to the second image sensor 906, and the second prism 918 is configured to refract light directed to the third image sensor 914. In some implementations, the first prism 910 includes the first mirror 912 that is configured to direct light toward the second image sensor 906, and the second prism 918 includes the second mirror 920 that is configured to direct light toward the third image sensor 914. For example, one side of the prism may include a reflective coating. In this manner, light passing through the prism and reaching the reflective coating are folded back toward the respective lens to focus the light toward the associated image sensor. In some other implementations, the first mirror 912 or the second mirror 920 may be a separate component from the first prism 910 and the second prism 918, respectively. As used herein, a prism may refer to any suitable light refracting object, such as a glass prism of a suitable shape. Suitable shapes may include a triangular prism, hexagonal prism, and so on with angles of surfaces configured to refract light from the scene as desired. While triangular prisms are illustrated in the example, the disclosure is not limited to a triangular prism to refract light.

The first prism 910 or the second prism 918 may be configured to refract light from a portion of the scene in order to adjust a focus distance. For example, the first prisms 910 and the second prism 918 may be shaped such that the entrance and exit angles of light for the prisms allow the associated lens 908 or 916 and the associated image sensor 906 or 914 to be in different positions while still having the field of views of the image sensors in the conceptual depiction 600 in FIG. 6. Based on refraction, the spacing between the first image sensor 902 and the second image sensor 906 or the third image sensor 914 may be greater than the spacing between the first image sensor 802 and the second image sensor 806 or the third image sensor 812 in FIG. 8 (in which refraction is not used). In this manner, the spacing between the first mirror 912 and the second mirror 920 may be greater than the spacing between the first mirror 810 and the second mirror 816 in FIG. 8. A greater spacing reduces the likelihood of the mirrors interfering with the field of view of the first image sensor 902. Additionally, the first image sensor 902 may have a greater field of view as a result of a greater spacing between the mirrors. Similar to FIG. 8, the mirrors or prisms allow for the lenses 904, 908, and 918 to be positioned without being collocated (such as in a single prism).

The first prism 910 and/or the second prism 918 may also be configured to reduce perspective distortion. For example, the prisms may be shaped to restrict or adjust the range of angles of light from the scene which is directed to the associated image sensor. In this manner, a perspective distortion may be reduced by reducing the steepness of the angle of approaching light directed to the associated image sensor. In addition or to the alternative, a perspective error may be reduced by performing a perspective distortion correction to the frames post-capture. Similar to FIG. 8, the image sensors 902, 906, and 914 are configured to concurrently capture image frames. The image frames are then combined by a device to generate a wide angle image (which may also be referred to as a combined image).

Figure 10:
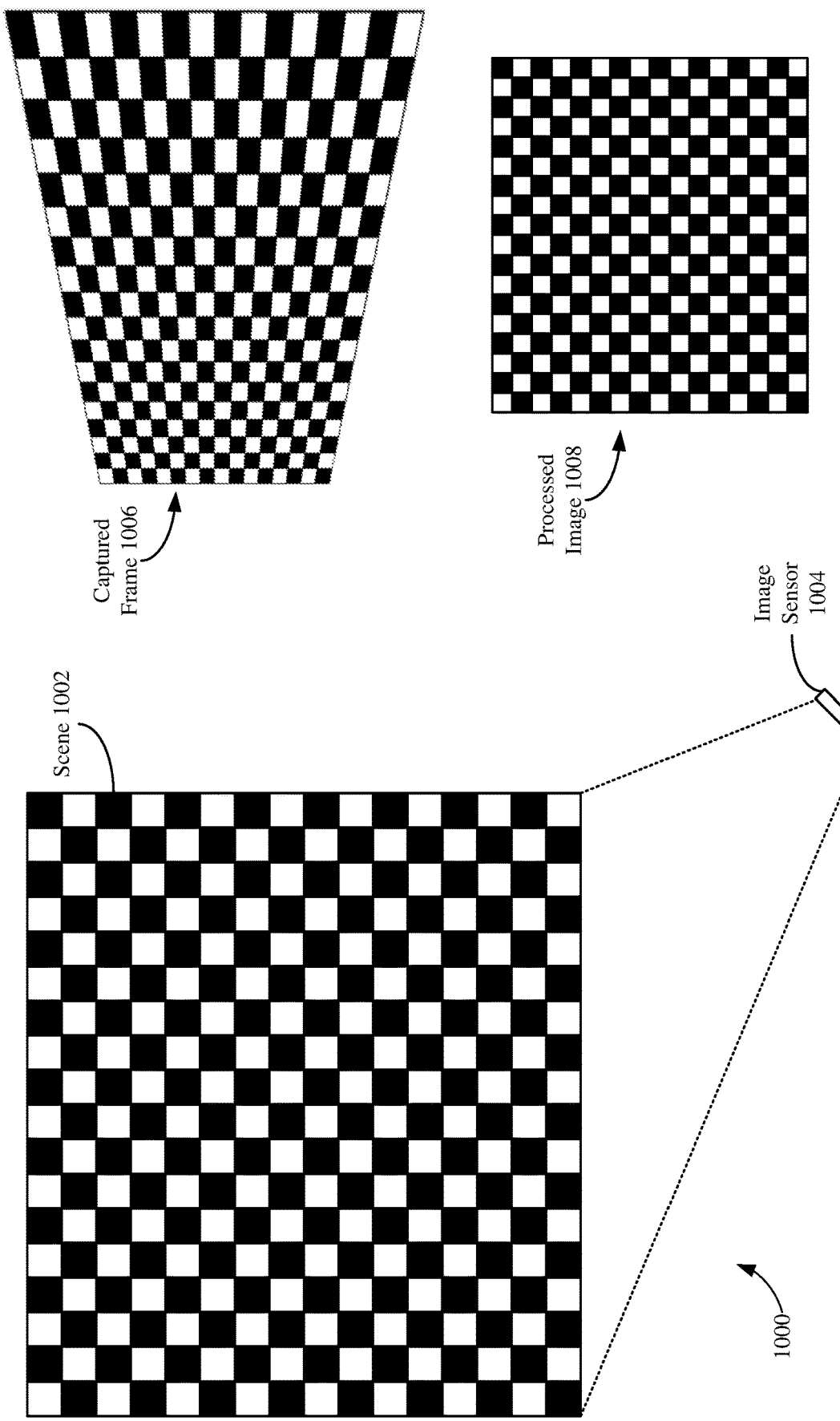
FIG. 10 is a depiction of an example perspective distortion in an image frame captured by one or more of the image sensors.

As noted above, frames captured by the second image sensor 806 and 906 or by the third image sensor 812 and 914 include a perspective distortion. FIG. 10 is a depiction 1000 of an example perspective distortion in an image frame 1006 captured by the image sensor 1004. The image sensor 1004 may be a conceptual implementation of the second image sensor 806 in FIG. 8 or 906 in FIG. 9 (without a mirror or prism). As shown, the image sensor 1004 captures the scene 1002 at an angle to the scene 1002. Since the right portion of the scene 1002 is closer to the image sensor 1004 than the left portion of the scene 1002, the captured frame 1006 includes a perspective distortion. The perspective distortion is shown as the right portion of the scene 1002 in the frame 1006 appearing larger than the left portion of the scene 1002 in the frame 1006. Since the angle of the image sensor 1004 with reference to the center image sensor is known, the device 500 (such as the image signal processor 512) may perform a perspective distortion correction to generate the processed image 1008.

In some implementations of a perspective distortion correction, the device 500 takes the smallest portion of the scene 1002 in the frame 1006 and adjusts the remainder of the frame 1006 to the size of the smallest portion of the scene 1002. For example, the device 500 may assume that all of the pixels in the furthest right column of the frame 1006 include information regarding the scene 1002. Based on the angle between the image sensor 1004 and a center image sensor, the device 500 may also know (such as be stored) the number of pixels including scene information in the furthest left column of the captured frame 1006. The rate at which the number of pixels including scene information decreases when moving from the furthest right column toward the furthest left column may be a linear regression. In this manner, the number of pixels including scene information for any pixel column in the captured frame 1006 may be a mapping based on the distance of the pixel column from the left column and from the right column. For example, if the frame 1006 includes 100 columns of 100 pixels and the left column includes 50 pixels of scene information, the 50th column may include approximately 75 pixels of scene information (0.5*50+0.5*100). In addition, the pixels including scene information may be centered at the center of the column of the frame 1006. Continuing the previous example, the 50th column may include 12 or 13 pixels at the bottom of the column not including scene information and may include 13 or 12 pixels at the top of the column not including scene information.

Based on the number of pixels including scene information for the column with the smallest number of pixels including scene information, the device 500 may adjust the other columns' pixel values so that the top of the scene 1002 and the bottom of the scene 1002 are approximately parallel with the frame 1006 (such as illustrated in processed image 1008). For example, a binning or combination filter (such as an averaging, median, and so on) may be applied to one or more columns of pixel values to adjust the size of the scene 1002 in frame 1006 to generate the processed image 1008. Similar filters may be applied in the horizontal direction, too, to prevent the scene 1002 from appearing stretched in a processed image. Any suitable filter may be used to combine pixel values to generate the processed image 1008 in reducing perspective distortion.

As a result of the perspective correction filter, the processed image 1008 may be smaller (include less pixels horizontally and vertically) than the captured frame 1008. In this manner, the processed image 1008 may have a lower resolution than the image from the center image sensor for combining to generate the wide angle image. In some implementations, the field of view of the wide angle image may be adjusted (increased or decreased) based on a size of a portion of image frames to the sides of a center image frame to be combined with the center image frame. In this manner, if the portion of the captured frame 1006 to be combined with the center image frame is decreased, the processed image 1008 may have an increased resolution. For example, if only half of the captured frame 1008 is to be combined, the processed image 1008 may have a resolution that is halfway between the smallest resolution for the image 1008 and the largest resolution for the image 1008 (which may be the resolution of the captured frame 1006). The resolution of the center image frame may be adjusted to be similar to the processed image 1008 to be combined. In this manner, the resulting resolution of the wide angle image frame may be increased based on decreasing the field of view of the wide angle image (and thus decreasing the size of the portions of frames to be combined with a center frame). In some other implementations, the wide angle image may include a resolution that decreases when moving from the center of the image toward the edges that were captured by the non-center image sensors. In this manner, an object of interest at the center of the image may be remain in a full resolution as captured by the center image sensor (such as the first image sensor 802 or 902). Then, the edges of the wide angle image may include the processed image 1008 stretched to include similar dimensions as the center frame (such as a similar number of pixels per column while retaining an aspect ratio).

As noted above, at least a portion of a second frame captured by a second image sensor 806 or 906 and at least a portion of a third frame captured by a third image sensor 812 or 914 are combined with a first frame captured by a first image sensor 802 or 902. In some implementations, the device 500 uses an overlap between fields of view of the image sensors to combine the frames. As used herein, combining the frames refers to combining a portion or all of each frame together to generate the wide angle image. For example, the device 500 may stitch at least a portion of a second frame to a first frame and the device 500 may stitch at least a portion of a third frame to the first frame to generate the wide angle image.

Figure 11:
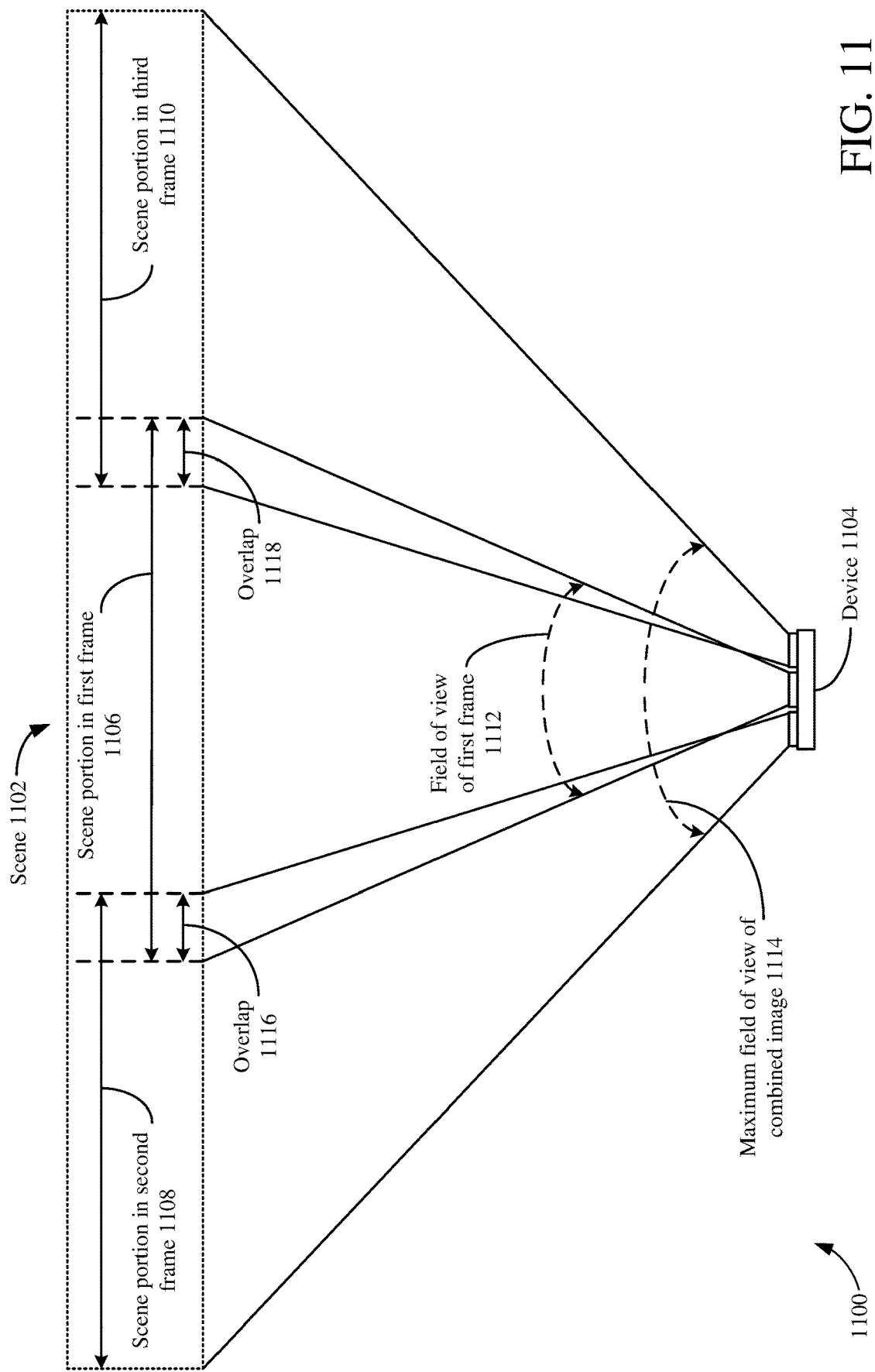
FIG. 11 is a depiction of example portions of a scene captured by three image sensors.

FIG. 11 is a depiction 1100 of example portions 1106-1110 of a scene 1102 captured by three image sensors of the device 1104. The device 1104 may be an example of the device 500 in FIG. 5. As illustrated, a middle image sensor of the device 1104 may capture a first image frame including a first portion 1106 of the scene 1102, a left image sensor of the device 1104 may capture a second image frame including a second portion 1108 of the scene 1102, and the right image sensor of the device 1104 may capture a third image frame including a third portion 1110 of the scene 1102. As shown, the first portion of the scene 1106 and the second portion of the scene 1108 may have an overlap 1116, and the first portion of the scene 1106 and the third portion of the scene 1110 may have an overlap 1118.

In some implementations, the device 1104 combines the second image frame to the first image frame by using the overlap 1116 between the portions 1106 and 1108 to stitch the second image frame to the first image frame. Similarly, the device 1104 may use the overlap 1118 between the portions 1106 and 1110 to stitch the third image frame to the first image frame. Any suitable stitching operation may be performed by the device 1104 (such as by an image signal processor) to combine the image frames. For example, the device 1104 may perform perspective correction on the second image frame and the third image frame, and the device 1104 may then stitch the corrected image frames to the first image frame to generate the wide angle image.

In some implementations, only a portion of the second image frame and/or only a portion of the third image frame may be used for combining to the first image frame. In this manner, the device 1104 may adjust the field of view of the wide angle image. The field of view of the wide angle image may be greater than the first frame's field of view 1112 (up to a combined image's maximum field of view 1114 based on the fields of view of the image sensors).

Figure 12:
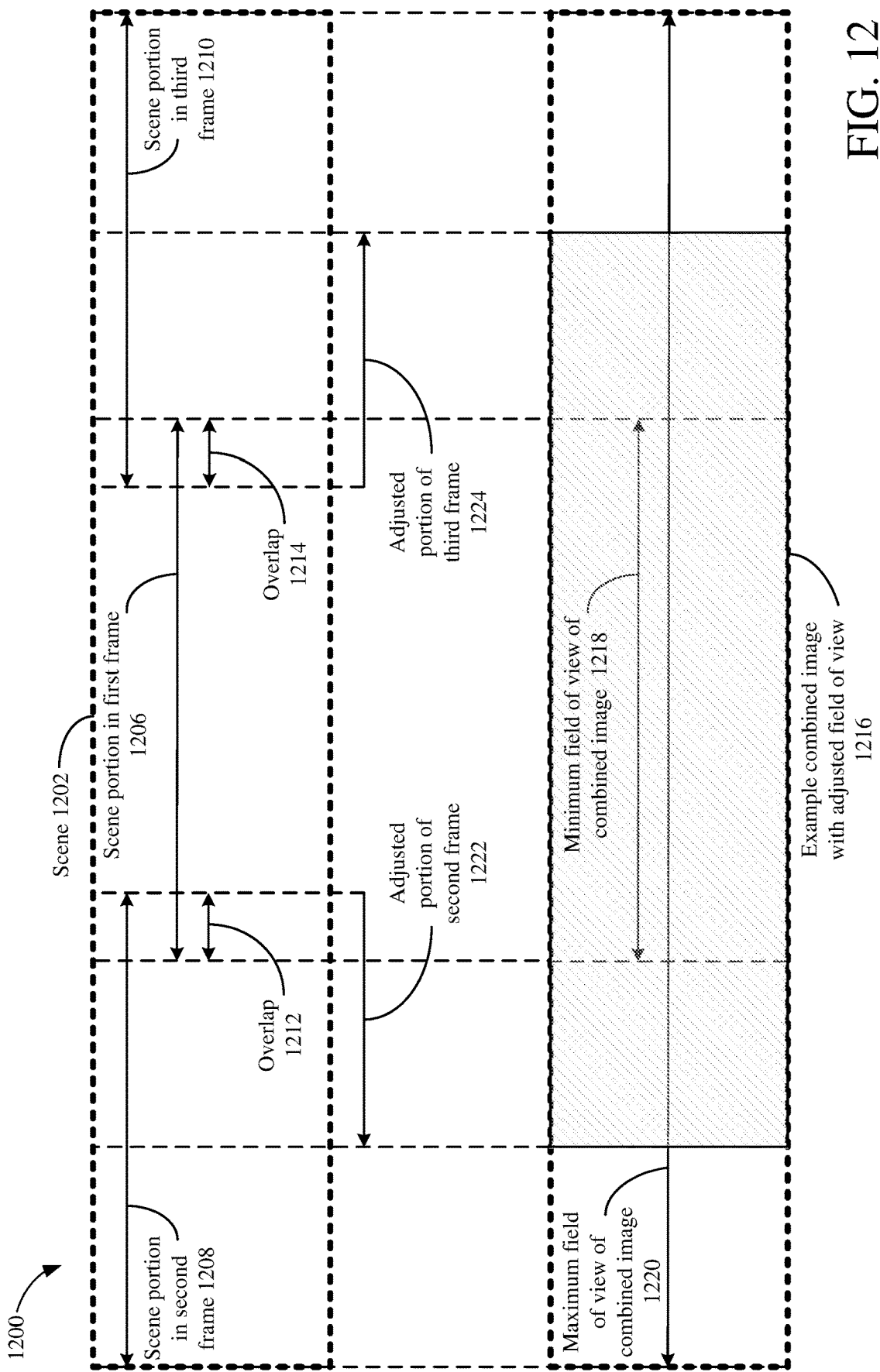
FIG. 12 is a depiction of an example adjustable field of view for a combined image.

FIG. 12 is a depiction 1200 of an example adjustable field of view for a combined image. The combined image is of at least a portion of the scene 1202. The device 500 may use the first image sensor 501 to capture a first image frame including the scene portion 1206 in the middle of the scene 1202. The device 500 may also use the second image sensor 502 to concurrently capture a second image frame including the scene portion 1208. The device 500 may also used the second image sensor 502 to concurrently capture a third image frame including the scene portion 1210. As shown, the scene portion 1206 and the scene portion 1208 include an overlap 1212, and the scene portion 1206 and the scene portion 1210 include an overlap 1214.

In the example depiction, the portion of the second image frame to be combined with the first image frame may be of any size between the frame portion associated with the overlap 1212 and the entire frame that is associated with the entire scene portion 1208. Similarly, the portion of the third image frame to be combined with the first image frame may be of any size between the frame portion associated with the overlap 1214 and the entire frame that is associated with the entire scene portion 1210. In this manner, the minimum field of view 1218 of the combined image is greater than the field of view of the first image frame, and the maximum field of view 1220 is the combination of the fields of view of the first image frame, the second image frame, and the third image frame.

In the depiction 1200, an example combined image 1216 with an adjusted field of view may be generated by the device 500. To generate the combined image 1216, the adjusted portion 1222 of the second image frame is combined with (such as stitched to) the first image frame, and the adjusted portion 1224 of the third image frame is combined with (such as stitched to) the first image frame. As noted above, a perspective distortion correction for the second image frame or the third image frame may reduce the resolution of the portion of the second image frame or the third image frame to be combined with the first image frame. In some implementations, perspective distortion correction may be performed for only the portions 1222 and 1224 to be combined with the first image frame. In this manner, the reduction in resolution may be decreased based on decreasing the size of the portions 1222 and 1224 (and thus decreasing the field of view of the combined image 1216).

Before, concurrently with, or after combining the first image frame, the second image frame, and the third image frame to generate a combined image, the device 500 may perform other processing filters on the combined image or the captured image frames. For example, the image frames may have different color temperatures or light intensities. The device 500 may perform a color cast filter or a luminance filter to cause the combined image to have a more uniform light intensity or color temperature across the image. Other example processing may include imaging processing filters performed during the image processing pipeline, such as denoising, edge enhancement, and so on. After processing the image, the device 500 may store the image, output the image to another device, output the image to a display 514, and so on. In some implementations, a sequence of wide angle images may be generated in creating a wide angle video. For example, the image sensors concurrently capture a sequence of frames, and the device 500 processes the associated frames as described for each in the sequence of frames to generate a sequence of combined images for a video. Example methods for generating a combined image are described below with reference to FIG. 13-FIG. 15. While the methods are described as being performed by the device 500, any suitable device may be used in performing the operations in the examples.

FIG. 13 is an illustrative flow chart of an example operation 1300 for generating a combined image from multiple image frames. At 1302, the device 500 may receive a first image frame of a scene captured by a first image sensor 501. For example, after the first image sensor 501 captures the first image frame (including a first portion of the scene), the image signal processor 512 may receive the first image frame. The first portion of the scene may be a center portion of the scene. At 1304, the device 500 may also receive a second image frame of the scene captured by a second image sensor 502. For example, after the second image sensor 502 captures the second image frame (including a second portion of the scene), the image signal processor 512 may receive the second image frame. The second portion of the scene may be a left portion, right portion, upper portion, or lower portion of the scene with reference to the center portion of the scene. At 1306, the device 500 may also receive a third image frame of the scene captured by a third image sensor 503. For example, after the third image sensor 503 captures the third image frame (including a third portion of the scene), the image signal processor 512 may receive the third image frame. The third portion of the scene may be a portion of the scene contra to the second portion of the scene. For example, if the second portion is a left portion of the scene with reference to the center portion, the third portion may be a right portion of the scene with reference to the center portion.

At 1308, the device 500 may generate a combined image from the first image frame, the second image frame, and the third image frame, and the combined image frame includes a field of view wider than the first image frame's field of view. In some implementations, at least a portion of the second image frame is combined with the first image frame, and at least a portion of the third image frame is combined with the first image frame. For example, the second image frame and the third image frame (or associated portions thereof) may be stitched to the first image frame at an associated edge of the first image frame. For example, if the second image frame is of a scene portion to the left of the center scene portion in the first image frame, the at least portion of the second image frame is stitched to the left edge of the first image frame. In some implementations, an overlap in the second portion of the scene and the first portion of the scene is used to stitch the first image frame and the second image frame, and an overlap in the third portion of the scene and the first portion of the scene is used to stitch the first image frame and the third image frame.

While not shown, the device 500 may continue processing the combined image, including performing denoising, edge enhancement, or any other suitable image processing filter in the image processing pipeline. The resulting image may be stored in the memory 506 or another suitable memory, may be provided to another device, may be displayed on display 514, or may otherwise be used in any suitable manner.

As noted above, the device 500 may include at least the image sensors 501-503 configured to capture the image frames for generating the combined image. FIG. 14 is an illustrative flow chart of an example operation 1400 for capturing multiple image frames to be combined to generate a combined image frame. In some implementations, the operations in FIG. 14 may be in addition to the operations in FIG. 13 to be performed by the device 500. For example, the device 500 may use a configuration of image sensors depicted in FIG. 8 or FIG. 9, or the device 500 may use another suitable configuration of the image sensors that conforms to the conceptual depiction 600 of the image sensor configuration in FIG. 6.

At 1402, the first image sensor 501 (including a first field of view) captures a first image frame. In some implementations, the first image sensor 501 is a center image sensor (such as the first image sensor 802 in FIG. 8 or the first image sensor 902 in FIG. 9). At 1404, the second image sensor 502 (including a second field of view) concurrently captures a second image frame. The second image sensor 502 may be an image sensor to the side of the center image sensor (such as the second image sensor 806 to the side of the first image sensor 802 in FIG. 8 or the second image sensor 906 to the side of the first image sensor 902 in FIG. 9).

In some implementations, a first mirror directs light to the second image sensor 502 to capture the second image frame (1406). In the example of FIG. 8, the mirror 810 may reflect the light from a second portion of the scene to the second image sensor 806. In the example of FIG. 9, the mirror 912 may reflect the light from the second portion of the scene to the second image sensor 906. In some implementations, a first prism may include the first mirror, and the first prism may refract the light directed to the second image sensor (1408). Referring back to the example of FIG. 9, the first mirror 912 may be part of a first prism 910. For example, a side of a triangular prism may include a reflective coating to reflect light passing through the prism.

At 1410, the third image sensor 503 (including a third field of view) concurrently captures a third image frame. The third image sensor 503 may be an image sensor to the side of the center image sensor (such as the third image sensor 812 to the side of the first image sensor 802 in FIG. 8 or the third image sensor 914 to the side of the first image sensor 902 in FIG. 9). In some implementations, a second mirror directs light to the third image sensor 503 to capture the second image frame (1412). In the example of FIG. 8, the mirror 816 may reflect the light from a third portion of the scene to the third image sensor 812. In the example of FIG. 9, the mirror 920 may reflect the light from the third portion of the scene to the third image sensor 914. In some implementations, a second prism may include the second mirror, and the second prism may refract the light directed to the third image sensor (1414). Referring back to the example of FIG. 9, the second mirror 920 may be part of a second prism 918. For example, a side of a triangular prism may include a reflective coating to reflect light passing through the prism.

In this manner, three image frames may be concurrently captured by the image sensors 501-503 of the device 500. The captured image frames may be provided to other components of the device 500 (such as the image processor 512) to process the image frames (including combining the image frames to generate a wide angle image).

Figure 15:
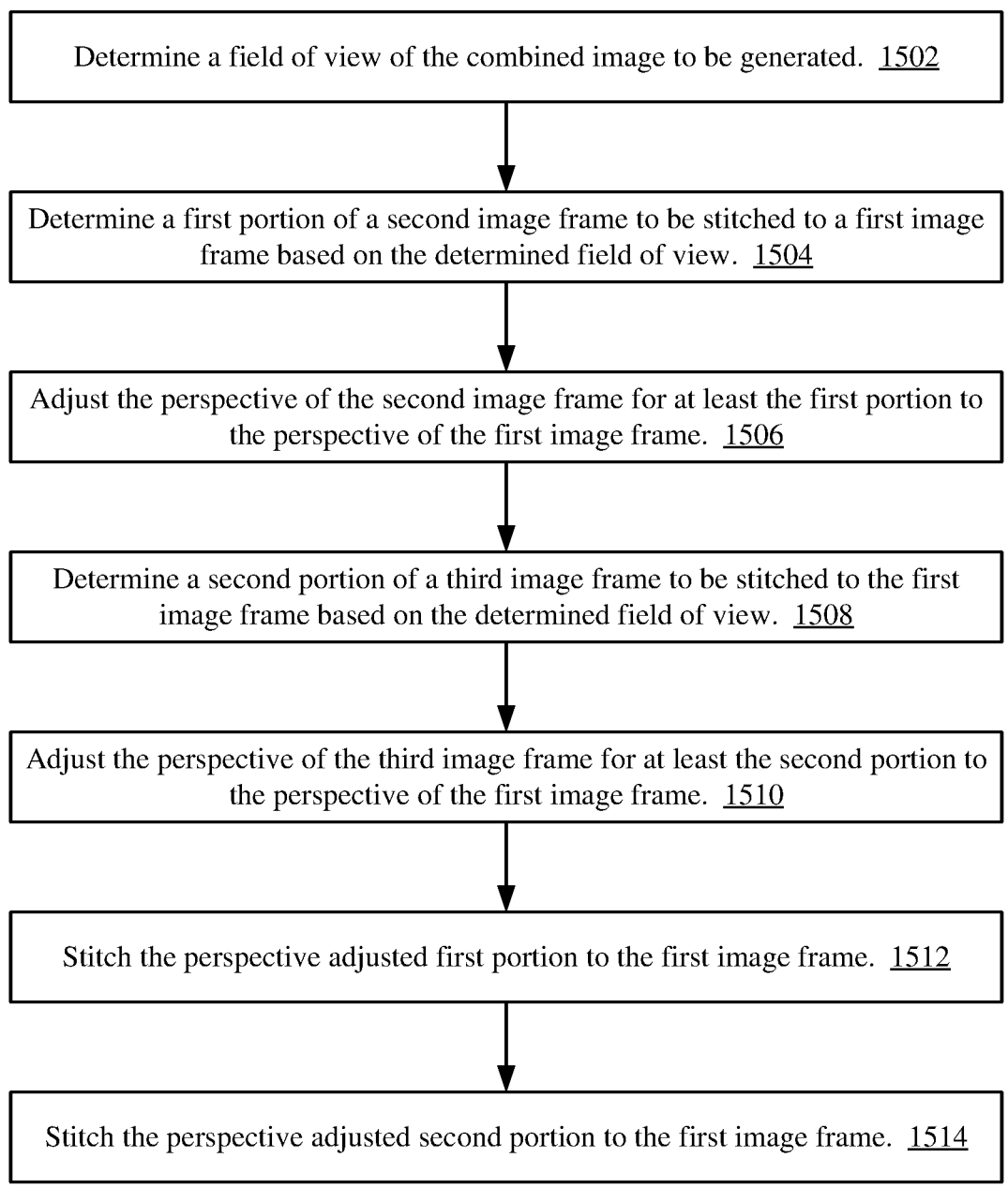
FIG. 15 is an illustrative flow chart of an example operation for combining multiple image frames to generate a combined image.

FIG. 15 is an illustrative flow chart of an example operation 1500 for combining multiple image frames to generate a combined image. Operation 1500 may be or include an example implementation of step 1308 in FIG. 13. At 1502, the device 500 may determine a field of view of the combined image to be generated. In some implementations, a user may indicate a field of view. For example, the display 514 may display a preview of a combined image with a maximum field of view that is not fully processed. The user may then indicate (such as via a graphical user interface), the field of view of a combined image to be generated. For example, referring back to FIG. 12, the display 514 may display a preview image including the maximum field of view 1220. The user may indicate (or the device 500 may otherwise determine, such as based on focus values, objects in the scene, and so on) that the field of view is to be the adjusted field of view for the combined image 1216. For example, the user may move sliders, touch the sides of the image, or otherwise interact with the display 514 to indicate the field of view of the combined image to be generated. If the first, second, and third image frames are stored, the device 500 may also generate new combined images with different fields of view based on an indication to adjust the field of view.

At 1504, the device 500 may determine a first portion of a second image frame to be stitched to a first image frame based on the determined field of view. For example, referring back to FIG. 12, if the device 500 determines that the field of view is to be as shown for the combined frame 1216, the device 500 determines the first portion to be the second frame portion 1222.

At 1506, the device 500 may adjust the perspective of the second image frame (for at least the first portion) to the perspective of the first image frame. In some implementations, the device 500 may perform perspective distortion correction on the entire second frame, and the first portion of the corrected second frame is used for combining with the first image frame. In some other implementations, the device 500 may perform perspective distortion correction on just the portion of the second frame to be combined (such as the portion 1222 in FIG. 12). In this manner, the reduction in resolution may be decreased as a result of not performing perspective distortion correction on the entire second image frame. In addition or to the alternative, the device 500 may use a first prism to reduce perspective distortion during image frame capture.

At 1508, the device 500 may determine a second portion of a third image frame to be stitched to a first image frame based on the determined field of view. For example, referring back to FIG. 12, if the device 500 determines that the field of view is to be as shown for the combined frame 1216, the device 500 determines the second portion to be the third frame portion 1224.

At 1510, the device 500 may adjust the perspective of the third image frame (for at least the second portion) to the perspective of the first image frame. In some implementations, the device 500 may perform perspective distortion correction on the entire third frame, and the second portion of the corrected third frame is used for combining with the first image frame. In some other implementations, the device 500 may perform perspective distortion correction on just the portion of the third frame to be combined (such as the portion 1224 in FIG. 12). In this manner, the reduction in resolution may be decreased as a result of not performing perspective distortion correction on the entire second image frame. In addition or to the alternative, the device 500 may use a second prism to reduce perspective distortion during image frame capture.

While the examples illustrate the adjustable field of view having the same adjustment applied to both sides of the image, each side's field of view may be adjusted independently. For example, the portion 1222 may be a different size than the portion 1224. If the portion 1222 is wider than the portion 1224, the field of view to the left of center in the combined image is greater than the field of view to the right of center in the combined image (and vice versa).

At 1512, the device 500 may stitch the perspective adjusted first portion to the first image frame. For example, the portion 1222 may be stitched to the first image frame. At 1514, the device 500 may stitch the perspective adjusted second portion to the first image frame. For example, the portion 1224 may be stitched to the first image frame. Stitching may include any suitable operation to combine at least a portion of an image frame with the first image frame. For example, stitching may include blending, color matching, luminance balancing, or other operations or filters to reduce stitching distortions. In addition to stitching, the device 500 may process the individual frames or the combined image via an image processing pipeline (such as by one or more filters of an image signal processor 512). The combined images may be individual wide angle images or part of a wide angle video with a field of view greater than the first image frame's field of view. The wide angle images have a reduction in distortions based on using multiple image sensors (such as in the conceptual configuration in FIG. 6). Additionally, the use of a center image sensor to capture the center of a scene for a combined image prevents stitching distortions in the center of the combined image (which may include an object of interest for the image).

Since multiple image sensors may be used to generate a wide angle image, in some implementations, the device 500 may switch between camera modes based on the type of image to generate. For example, in a first mode, a user may select whether to use a specific one of the image sensors to capture an image (such as selecting the first image sensor 501 to capture an image frame for a telephoto image). In a second mode, the device 500 uses the three image sensor 501-503 to capture image frames in order to generate a wide angle image. A user may indicate that the device 500 is to switch between modes (such as via a graphical user interface) or the device 500 may determine the mode based on a scene, a mode during a previous image capture session, or other suitable factors.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 506 in the example device 500 of FIG. 5) comprising instructions 508 that, when executed by the processor 504 (or the camera controller 510 or the image signal processor 512 or another suitable component), cause the device 500 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 504 or the image signal processor 512 in the example device 500 of FIG. 5. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As noted above, while the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device for digital imaging, comprising:
a memory; and
one or more processors configured to:
receive a first image frame of a scene captured by a first image sensor;
receive a second image frame of the scene captured by a second image sensor;
receive a third image frame of the scene captured by a third image sensor; and
generate a combined image from the first image frame, the second image frame, and the third image frame at least in part by stitching at least a first portion of the second image frame to the first image frame and a second portion of the third image frame to the first image frame, wherein the combined image includes a first field of view that is wider than a field of view of the first image frame.

2. The device of claim 1, wherein the one or more processors are configured to adjust one or more of:
the second image frame from a second perspective to a first perspective; or
the third image frame from a third perspective to the first perspective, wherein:
the first image frame is captured from the first perspective;
the second image frame is captured from the second perspective; and
the third image frame is captured from the third perspective.

3. The device of claim 2, wherein the one or more processors are configured to adjust the second image frame or the third image frame to the first perspective by performing perspective distortion correction after capture.

4. The device of claim 1, wherein the one or more processors are configured to adjust a size of the first portion and adjust a size of the second portion to adjust the first field of view of the combined image.

5. The device of claim 1, further comprising:
the first image sensor;
the second image sensor;
the third image sensor;
a first mirror configured to reduce a first parallax distortion between the first image frame and the second image frame during capture; and
a second mirror configured to reduce a second parallax distortion between the first image frame and the third image frame during capture.

6. The device of claim 5, wherein reducing the first parallax distortion and reducing the second parallax distortion is based on a position of the first image sensor with reference to a position of the second image sensor and a position of the third image sensor.

7. The device of claim 6, further comprising:
a first prism configured to refract light to be captured by the second image sensor for capturing the second image frame, wherein the first prism includes the first mirror, wherein reducing the first parallax distortion is further based on a position of the first prism with reference to the position of the second image sensor; and
a second prism configured to refract light to be captured by the third image sensor for capturing the third image frame, wherein the second prism includes the second mirror, wherein reducing the second parallax distortion is further based on a position of the second prism with reference to the position of the third image sensor.

8. A method for digital imaging, comprising:
receiving a first image frame of a scene captured by a first image sensor;
receiving a second image frame of the scene captured by a second image sensor;
receiving a third image frame of the scene captured by a third image sensor; and
generating a combined image from the first image frame, the second image frame, and the third image frame at least in part by stitching at least a first portion of the second image frame to the first image frame and a second portion of the third image frame to the first image frame, wherein the combined image includes a first field of view that is wider than a field of view of the first image frame.

9. The method of claim 8, further comprising adjusting one or more of:
the second image frame from a second perspective to a first perspective; or
the third image frame from a third perspective to the first perspective, wherein:
the first image frame is captured from the first perspective;
the second image frame is captured from the second perspective; and
the third image frame is captured from the third perspective.

10. The method of claim 9, wherein adjusting one or more of the second image frame or the third image frame includes performing perspective distortion correction after capture.

11. The method of claim 8, further comprising adjusting the first field of view of the combined image, including:
adjusting a size of the first portion; and
adjusting a size of the second portion.

12. The method of claim 8, further comprising:
capturing the first image frame by the first image sensor;
directing, by a first mirror, a first light to be captured by the second image sensor to capture the second image frame, wherein the first mirror is configured to reduce a first parallax distortion between the first image frame and the second image frame;
capturing the second image frame by the second image sensor;
directing, by a second mirror, a second light to be captured by the third image sensor to capture the third image frame, wherein the second mirror is configured to reduce a second parallax distortion between the first image frame and the third image frame; and
capturing the third image frame by the third image sensor.

13. The method of claim 12, wherein reducing the first parallax distortion and reducing the second parallax distortion is based on a position of the first image sensor with reference to a position of the second image sensor and a position of the third image sensor.

14. The method of claim 13, further comprising:
refracting, by a first prism, the first light, wherein the first prism includes the first mirror and reducing the first parallax distortion is further based on a position of the first prism with reference to the position of the second image sensor; and
refracting, by a second prism, the second light, wherein the second prism includes the second mirror and reducing the second parallax distortion is further based on a position of the second prism with reference to the position of the third image sensor.

15. A non-transitory, computer readable medium storing instructions that, when executed by one or more processors of a device for digital imaging, causes the device to:
receive a first image frame of a scene captured by a first image sensor;
receive a second image frame of the scene captured by a second image sensor;
receive a third image frame of the scene captured by a third image sensor; and
generate a combined image from the first image frame, the second image frame, and the third image frame at least in part by stitching at least a first portion of the second image frame to the first image frame and a second portion of the third image frame to the first image frame, wherein the combined image includes a first field of view that is wider than a field of view of the first image frame.

16. The computer readable medium of claim 15, wherein execution of the instructions further causes the device to adjust one or more of:
the second image frame from a second perspective to a first perspective; or
the third image frame from a third perspective to the first perspective, wherein:
the first image frame is captured from the first perspective;
the second image frame is captured from the second perspective; and
the third image frame is captured from the third perspective.

17. The computer readable medium of claim 16, wherein execution of the instructions for adjusting one or more of the second image frame or the third image frame causes the device to perform perspective distortion correction after capture.

18. The computer readable medium of claim 15, wherein execution of the instructions further causes the device to adjust the first field of view of the combined image, including:
adjust a size of the first portion; and
adjust a size of the second portion.

19. The computer readable medium of claim 15, wherein execution of the instructions further causes the device to:
capture the first image frame by the first image sensor;
direct, by a first mirror, a first light to be captured by the second image sensor to capture the second image frame, wherein the first mirror is configured to reduce a first parallax distortion between the first image frame and the second image frame;
capture the second image frame by the second image sensor;
direct, by a second mirror, a second light to be captured by the third image sensor to capture the third image frame, wherein the second mirror is configured to reduce a second parallax distortion between the first image frame and the third image frame; and
capture the third image frame by the third image sensor.

20. The computer readable medium of claim 19, wherein reducing the first parallax distortion and reducing the second parallax distortion is based on a position of the first image sensor with reference to a position of the second image sensor and a position of the third image sensor.

21. The computer readable medium of claim 20, wherein execution of the instructions further causes the device to:
refract, by a first prism, the first light, wherein the first prism includes the first mirror and reducing the first parallax distortion is further based on a position of the first prism with reference to the position of the second image sensor; and refract, by a second prism, the second light, wherein the second prism includes the second mirror and reducing the second parallax distortion is further based on a position of the second prism with reference to the position of the third image sensor.

22. A device for digital imaging, comprising:

means for receiving a first image frame of a scene;

means for receiving a second image frame of the scene;

means for receiving a third image frame of the scene; and means for generating a combined image from the first image frame, the second image frame, and the third image frame at least in part by stitching at least a first portion of the second image frame to the first image frame and a second portion of the third image frame to the first image frame, wherein the combined image includes a first field of view that is wider than a field of view of the first image frame.

23. The device of claim 22, further comprising means for adjusting one or more of:

the second image frame from a second perspective to a first perspective; or the third image frame from a third perspective to the first perspective, wherein:

the first image frame is captured from the first perspective;

the second image frame is captured from the second perspective; and the third image frame is captured from the third perspective.

24. The device of claim 23, further comprising means for adjusting the second image frame or the third image frame to the first perspective by performing perspective distortion correction after capture.

25. The device of claim 22, further comprising means for adjusting the first field of view of the combined image, including:

adjusting a size of the first portion; and adjusting a size of the second portion.

26. The device of claim 22, further comprising:

means for capturing the first image frame;

means for directing a first light to be captured for the second image frame, wherein the means for directing the first light is configured to reduce a first parallax distortion between the first image frame and the second image frame;

means for capturing the second image frame;

means for directing a second light to be captured for the third image frame, wherein the means for directing the second light is configured to reduce a second parallax distortion between the first image frame and the third image frame; and means for capturing the third image frame.

27. The device of claim 26, wherein:

the means for directing the first light includes means for refracting the first light; and the means for directing the second light includes means for refracting the second light.

28. The device of claim 26, wherein reducing the first parallax distortion and reducing the second parallax distortion is based on a position of the means for receiving the first image frame with reference to a position of the means for receiving the second image frame and a position of the means for receiving the third image frame.

* * * * *